United States Patent
Makii

(10) Patent No.: US 7,295,772 B2
(45) Date of Patent: Nov. 13, 2007

(54) OPTICAL UNIT AND IMAGING DEVICE COMPRISING OPTICAL UNIT

(75) Inventor: Tatsuo Makii, Tokyo (JP)

(73) Assignee: Sony Corporation, Tokyo (JP)

( * ) Notice: Subject to any disclaimer, the term of this patent is extended or adjusted under 35 U.S.C. 154(b) by 208 days.

(21) Appl. No.: 10/532,329

(22) PCT Filed: Oct. 24, 2003

(86) PCT No.: PCT/JP03/13642

§ 371 (c)(1),
(2), (4) Date: Apr. 22, 2005

(87) PCT Pub. No.: WO2004/049058

PCT Pub. Date: Jun. 10, 2004

(65) Prior Publication Data

US 2006/0165406 A1   Jul. 27, 2006

(30) Foreign Application Priority Data

Oct. 24, 2002 (JP) ............................. 2002-310204
Oct. 28, 2002 (JP) ............................. 2002-312946

(51) Int. Cl.
*G03B 7/00* (2006.01)
*G03B 5/06* (2006.01)
*G03B 17/04* (2006.01)

(52) U.S. Cl. ...................................... 396/241; 396/350

(58) Field of Classification Search ................ 396/73, 396/349, 350, 241
See application file for complete search history.

(56) References Cited

U.S. PATENT DOCUMENTS

| 4,681,418 | A | * | 7/1987 | Kodaira | 396/73 |
|---|---|---|---|---|---|
| 4,768,048 | A | * | 8/1988 | Wakabayashi | 396/75 |
| 4,887,107 | A | * | 12/1989 | Nakamura et al. | 396/75 |
| 4,937,609 | A | * | 6/1990 | Wakabayashi et al. | 396/73 |
| 5,086,312 | A | * | 2/1992 | Tanaka et al. | 396/75 |
| 5,765,049 | A | * | 6/1998 | Hase et al. | 396/73 |
| 6,339,681 | B1 | | 1/2002 | Takeshita | |
| 2005/0036777 | A1 | * | 2/2005 | Nomura et al. | 396/73 |
| 2005/0207748 | A1 | * | 9/2005 | Ishizuka et al. | 396/349 |

FOREIGN PATENT DOCUMENTS

| JP | 7-72374 | 3/1995 |
|---|---|---|
| JP | 2000-194046 | 7/2000 |
| JP | 2000-261716 | 9/2000 |
| JP | 2001-330878 | 11/2001 |
| JP | 2002-176573 | 6/2002 |

* cited by examiner

*Primary Examiner*—Christopher Mahoney
(74) *Attorney, Agent, or Firm*—Frommer Lawrence & Haug LLP; William S. Frommer; Thomas F. Presson

(57) ABSTRACT

A collapsible lens mount optical unit comprises a fixed lens mount, a lens mount movable along the optical axis with respect to the fixed lens mount, an infrared ray intercepting filter interposed between the fixed lens mount and the lens mount. The collapsible lens mount optical unit further comprises a move-aside mechanism. When the lens mount is retracted and made to approach the infrared ray intercepting filter, the move-aside mechanism moves aside the infrared intercepting filter out of the optical axis in a direction perpendicular to the optical axis. The lens can be accommodated in a position on the optical axis after the infrared intercepting filter is moved.

12 Claims, 16 Drawing Sheets

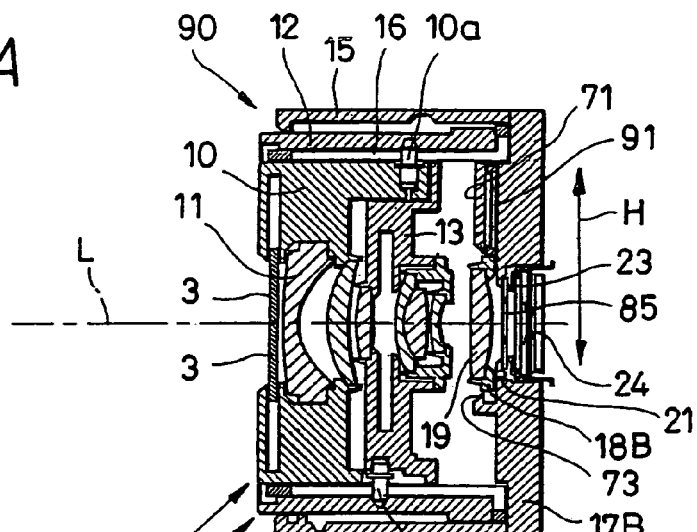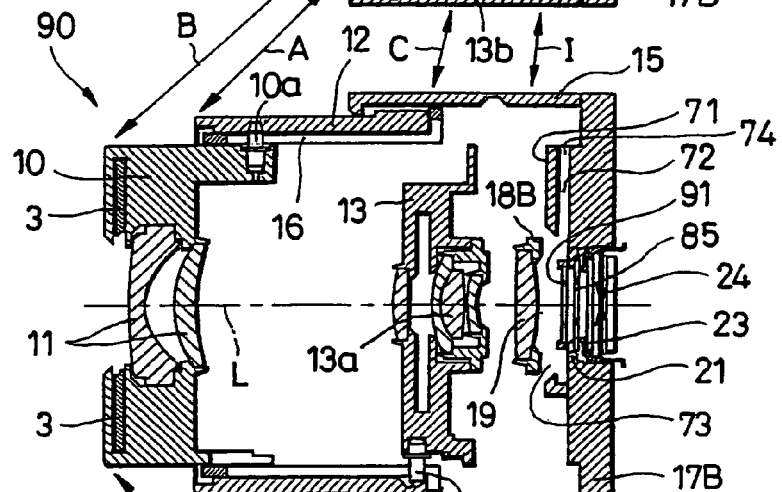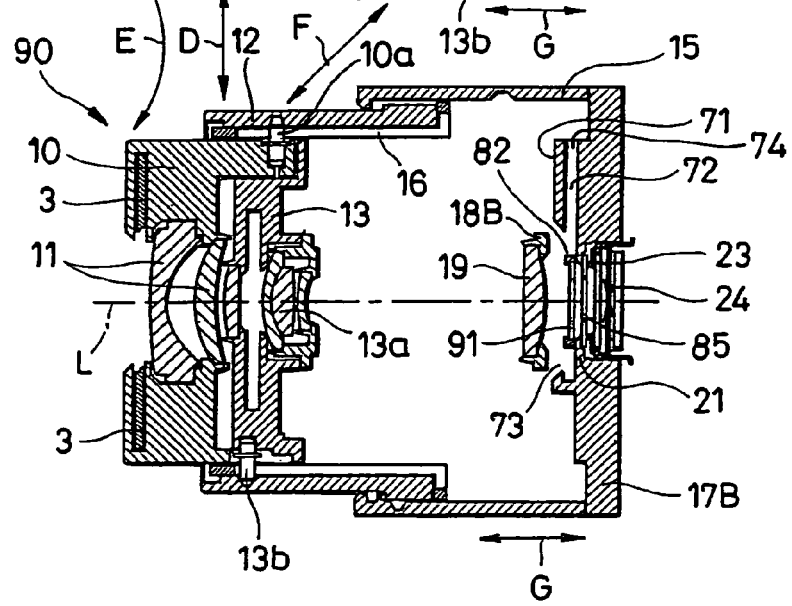

OPTICAL UNIT AND IMAGING DEVICE COMPRISING OPTICAL UNIT

TECHNICAL FIELD

The present invention relates to a collapsible optical unit in which an optical system is capable of moving between its working position and its retracted position, as well as an image-pickup apparatus provided with the optical unit, such as a digital still camera and a digital video camera. Particularly, the present invention relates to an optical unit as well as an image-pickup apparatus provided with the optical unit, in which by making an optical filter escape in a direction intersecting its optical axis when collapsing the optical unit, a lens frame of a focusing lens, for example, is retracted into a space made by the escape to make a collapsible lens thinner in shape, and on an abnormal occasion where a user performs collapsing operation by force or where an escape mechanism does not work at the time of collapsing the optical unit, the optical filter on the optical axis is forced to escape from the optical axis.

BACKGROUND ART

In recent years, the improvement in portability and operability of an image-pickup apparatus such as a digital still camera and a digital video camera has been in demand, and size of the whole apparatus has been pursued to be small-sized, in which a lens and lens barrel of an optical system used in the image-pickup apparatus has also been small-sized. In addition, further high quality and high density pixels of a taken picture is strongly requested, so that there may be a case where, even though lenses forming an optical system become large in size, it is requested for the lens barrel in the optical system to be made small in size by miniaturizing a drive mechanism.

Further, with respect to what is called a collapsible lens used for the image-pickup apparatus such as a digital still camera and a digital video camera, from the viewpoint of convenience on portability, there is a demand to make the lens small in size and thin in profile. Further, in the image-pickup apparatus such as a digital still camera and a digital video camera, a solid-state imaging device of CCD, CMOS or the like picks up an image of a subject formed by barrels in an optical system, converts the picked-up light photoelectrically into an electric signal to be output, and generates digital data corresponding to the image of the subject.

In this case, since the solid-state imaging device of CCD, CMOS or the like makes a geometrically-dispersive sampling, when the image-pickup device takes a picture of a geometrical pattern finer than its periodic arrangement (hair, stripe pattern, tile pattern or the like), a false color signal or moiré, for example, will arise and give a incongruous feeling to the picture, which is inconvenient.

In order to remove the unnecessary high-frequency component, adding a blur is conventionally carried out by means of an optical low-pass filter. With respect to an optical low-pass filter, various "blurring" means making use of diffraction phenomena, double refraction, spherical aberration and the like are proposed and practiced.

Further, since the solid-state imaging device such as CCD or CMOS has conventionally a high sensitivity not only regarding visible light but also regarding infrared rays, it is impossible to reproduce a correct color without cutting off the unnecessary infrared rays. To cut off the unnecessary infrared rays, an infrared cutoff filter is employed and the infrared cutoff filter has a function of putting color reproduction of long-wavelength rays in order by absorbing not only the infrared rays but also rays from orange to red along a gradual absorption curve. Of the infrared cutoff filters, other than an absorption type using glass or plastics, there is a type of reflecting infrared rays using the multicoating not to transmit light.

A conventional image-pickup apparatus such as a digital still camera and a digital video camera uses an infrared cutoff filter in order to obtain a high color reproducibility as described above (refer to, for example, Patent Literature 2). It is designed that the infrared cutoff filter can be disposed on the optical path and can be removed from the optical path. Further, by irradiating a subject with infrared rays using an infrared light and the like, even in a pitch-dark environment in which an ordinary image-pickup apparatus such as a digital still camera and a digital video camera cannot take a picture, it is capable of taking a picture without using flashlight or lighting ("night-shot function").

In addition to the above-described night-shot function (infrared-photography function), the applicant of the present invention has recently developed such a function ("night-framing function") in which, by setting the infrared cutoff filter on and off an optical axis of a lens synchronously with focusing, compatibility between framing in the dark and image-recording in natural hues is obtained. This is the photographing in which at the time of framing, by making the infrared cutoff filter retreat or escape off the optical axis, an accurate framing is attained in a state of the infrared photography and at a stage of focusing, the infrared cutoff filter is brought back onto the optical axis for focusing, and then at the time of photographing (recording), a flashlight is activated for taking a picture with a natural color reproduction.

FIG. 9 is a perspective view showing an external-appearance of a state in which lenses of a digital still camera are not used and are retracted, specifically, a state in which lens barrels are contracted to be in a collapsed state. FIG. 10 is a perspective view showing an external-appearance of a state in which the camera is in use and lens barrels are elongated, specifically, a wide angle state or a telephoto state. FIGS. 11A, 11B and 11C show an external appearance of the collapsible lens included in an optical unit; FIG. 11A is a perspective view showing the collapsed state; FIG. 11B is the wide state thereof; and FIG. 11C is the telephoto state thereof.

Further, FIGS. 12A, 12B and 12C show a conventional collapsible lens included in an optical unit; FIG. 12A is a sectional view of the lens-retracted position when not used; FIG. 12B is that of the wide angle position; and FIG. 12C is that of the telephoto position. Also, FIG. 13 is an exploded perspective view of the collapsible lens shown in FIGS. 12A to 12C.

First, a main structure of a digital still camera will be described with reference to FIGS. 9 and 10. A reference numeral 1 denotes a camera body of the digital still camera and a reference numeral 2 denotes an image-pickup lens portion of a collapsible type, which is provided on the front surface of one side of the camera body 1. In the collapsed state in FIG. 9, barriers 3 protect the front lens surface of the image-pickup lens portion 2. On the front-surface side of the camera body 1 are arranged a finder lens 4, a strobe 5, and an auto focus auxiliary-light receiving portion 6 for detecting a distance to a subject. A reference numeral 7 denotes a finder window; a reference numeral 8 denotes a shutter button; and a reference numeral 9 denotes a knob for changing modes.

Next, a structure of the image-pickup lens portion 2 that is the collapsible optical unit will be described in detail with reference to FIGS. 11A to 11C and FIGS. 12A to 12C. The collapsible optical unit shown in FIGS. 12A to 12C is of a type incapable of photographing at night (of a type without a night shot function).

A reference numeral 10 denotes a first group lens frame holding a plurality of lenses 11. The first group lens frame 10 includes a plurality of cam pins 10a to be fitted into a first cam groove 12a of a cam ring 12. The first group lens frame 10 is molded from, for example, a black polycarbonate resin containing glass fiber and has the strength as well as a light shielding nature.

A reference numeral 13 denotes a second group lens frame holding a plurality of lenses 13a. The second group lens frame 13 includes a plurality of cam pins 13b to be fitted into a second cam groove 12b of the cam ring 12. The second group lens frame 13 is molded from, for example, a black polycarbonate resin containing glass fiber and has the strength as well as a light shielding nature. Further, the second group lens frame 13 may include an iris shutter mechanism.

The above-described cam ring 12 includes a gear portion 12c driven by a gear 14a of a gear unit 14 to rotate within the internal circumference of a fixed ring 15 and a plurality of cam pins 12d to be fitted into a cam groove 15a of the fixed ring 15. The cam ring 12 is molded from, for example, a black polycarbonate resin containing glass fiber and has the strength as well as a light shielding nature. The first cam groove 12a and the second cam groove 12b of the cam ring 12 make the first and second group lens frames 10 and 13 move along a predetermined curve in a direction of their optical axis L for zooming operation.

A reference numeral 16 denotes a straight forward guide ring which is a member moving in the direction of the optical axis L within the fixed ring 15 integrally with the cam ring 12. The straight forward guide ring 16 includes a plurality of guide grooves 16a for guiding the first group lens frame 10 in the direction of the optical axis and a plurality of guide grooves 16b for guiding the second group lens frame 13 in the direction of the optical axis. The straight forward guide ring is molded from, for example, a black polycarbonate resin containing glass fiber and has the strength as well as a light shielding nature.

The fixed ring 15 is a member fixed at a rear barrel 17. The fixed ring 15 is molded from, for example, a black polycarbonate resin containing glass fiber and has the strength as well as a light shielding nature.

A reference numeral 18 denotes a third group lens frame holding a lens 19. The third group lens frame 18 is molded from, for example, a black polycarbonate resin containing glass fiber and has the strength as well as a light shielding nature. The third group lens frame 18 is held to be movable in the direction of the optical axis with respect to the rear barrel 17; specifically, it is designed to move minutely in the direction of the optical axis by means of a power source not shown such as a stepping motor.

At the rear barrel 17 are fixed the fixed ring 15, a barrier drive mechanism 20 and the gear unit 14. Further, in the rear barrel 17, an optical filter 22 including an optical low-pass filter and an infrared cutoff filter is fixed to be positioned by a seal rubber 23 which elastically urges the filter at a holding portion 21 opposing the third group lens frame 18. Furthermore, in the rear barrel 17, a solid-state imaging device 24 such as CCD, CMOS or the like is positioned and fixed behind the optical filter 22.

The barrier drive mechanism 20 is a protruding member for driving barriers 3 to be closed linked with the collapsed image-pickup lens portion 2. In addition, the gear unit 14 drives the cam ring 12 into rotation through the gear portion 14a engaged with the gear 12c, and the gear ratio is determined such that a sufficient driving force can be obtained in the range from the collapsed state through the wide state to the telephoto state and from the telephoto state through the wide state to the collapsed state.

Next, the operation of the above-described image-pickup lens portion 2 will be described.

In operation from the collapsed state in FIG. 12A to the wide position in FIG. 12B, the gear 14a of the gear unit 14 engaged with the gear portion 12c of the cam ring 12 is driven by a driving source such as a DC motor, whereby the cam ring 12 moves toward a subject along the optical axis L while the cam pin 12d rotates along the cam groove 15a of the fixed ring 15. At this moment, the straight forward guide ring 16 moves forward integrally with the cam ring 12 as shown by an arrow mark A.

Concurrently, the first group lens frame 10 moves forward as shown by an arrow mark B while the cam pin 10a goes along the first cam groove 12a of the cam ring 12 and the guide groove 16a of the straight forward guide ring 16. Concurrently with this, the second group lens frame 13 moves forward as shown by an arrow mark C while the cam pin 13b goes along the second cam groove 12b of the cam ring 12 and the guide groove 16b of the straight forward guide ring 16. As a result of the above-described operation, the first group lens frame 10 and the second group lens frame 13 are brought to the optically wide position.

Although the cam ring 12 is driven by the gear unit 14 also in operation from the wide position to the telephoto position in FIG. 12C, the cam pin 12d goes along the horizontal cam groove 15b of the cam groove 15a in this operational range, so that the cam ring 12 does not move in the direction of the optical axis; and therefore, the straight forward guide ring 16 does not move either in the direction of optical axis as shown by an arrow mark D. At this time, the first group lens frame 10 moves as shown by an arrow mark E while the cam pin 10a goes along the cam groove 12a of the cam ring 12 and the guide groove 16a of the straight forward guide ring 16.

At the same time, the second group lens frame 13 moves forward as shown by an arrow mark F while the cam pin 13b thereof goes along the cam groove 12b of the cam ring 12 and the guide groove 16b of the straight forward guide ring 16. As a result of the above-described operation, the first group lens frame 10 and the second group lens frame 13 optically move between the wide position and the telephoto position for zooming operation (in the direction of an arrow mark G).

In addition, the movement from the telephoto position to the wide position and that from the wide position to the collapsed position are performed by driving the gear 14a of the gear unit 14 to rotate inversely, so that the cam ring 12 rotates in the opposite direction.

Hereupon, when the first group lens frame 10 and the second group lens frame 13 make zooming operation in this way, the third group lens frame 18 is displaced minutely in the direction of the optical axis by means of another driving source not shown such as a stepping motor or the like for focusing operation.

When the conventional collapsible lens 2 having the above structure is collapsed, a movable range of the third group lens frame 18 toward the solid-state imaging device 24 made of CCD, CMOS and the like is limited owing to the thickness of the optical filter itself such as an optical low-pass filter or an infrared cutoff filter and the thickness of portions where the optical filter is inserted and fixed. Moreover, there is also a certain limit in the distance between the third group lens frame 18 and the second group lens frame 13 and that between the second group lens frame 13 and the first group lens frame 10.

Even if the third group lens frame 18 is made to move until contacting with the rear barrel 17 (where the optical filter is inserted and fixed), and a distance between the third group lens frame 18 and the second group lens frame 13 and that between the second group lens frame 13 and the first group lens frame 10 may be made so small that they contact each other, respectively, a total collapsed length of the image-pickup lens portion 2 (collapsible lens) can be made thin in profile only to a certain extent.

Moreover, the optical filter 22 is used as an optical filter fixed to the rear barrel 17 in the state in which the infrared cutoff filter is stuck on the optical low-pass filter, so that the infrared cutoff filter can not be set on and off the optical axis, thus making the night shot impossible.

Next, the structure of a collapsible lens (image-pickup lens portion) 70 according to a conventional collapsible type optical unit capable of photographing at night (having night-shot function) will be described in detail with reference to FIGS. 14A to 14C, FIGS. 15A and 15B, FIGS. 16 and 17.

The night shot is a technique that can be performed by setting the infrared cutoff filter on and off the optical axis. The entire structure of the optical unit is the same as that of the above-described collapsible optical unit 2 (refer to FIGS. 12A to 12C) of the type incapable of photographing at night (without night-shot function). Therefore, the same parts are denoted by the same signs to dispense with description thereof and only different parts will be described.

As shown in FIGS. 14A to 14C, a rear barrel 17A includes a casing 71 formed of an almost rectangular parallelepiped approximately in the center of its surface opposing the fixed ring 15. As shown in FIGS. 16 and 17, inside the casing 71 is provided a filter-retracting portion 72 for arranging the optical filter (in this embodiment, an infrared cutoff filter 91) at an appropriate position in the direction of the optical axis of the lens. In front of the casing 71, an opening 73 corresponding to this filter-retracting portion 72 is provided for passing incident light from an object side toward the solid-state imaging device 24 such as CCD and CMOS held by the rear barrel 17A.

Moreover, on an upper surface of the casing 71 is provided an escape exit 74 for making the infrared cutoff filter 91, which is a specific example of the optical filter retracted in the filter-retracting portion 72, escape in the direction intersecting the optical axis L. On both sides of the escape exit 74 are provided a pair of guide portions 75 and 75 for guiding the infrared cutoff filter 91 appropriately in the direction intersecting the optical axis when the infrared cutoff filter moves under power.

Further, on a diagonally upper part of one surface of the rear barrel 17A is provided a power-source fitting portion 77 for fitting a power source 76 generating power for moving the infrared cutoff filter 91. As an example of the power source 76, a stepping motor can be used, and on the side where its rotation axis 76*a* projects is provided a flange portion 76*b* for fitting the power-source fitting portion 77. By fixing the flange portion 76*b* to the power-source fitting portion 77 through fastening means such as screws, the power source 76 is fitted to the rear barrel 17A. At this time, the rotation axis 76*a* is inserted into a bearing 77*a*.

The rotation axis 76*a* of the power source 76 is integrally provided with a rotary pin 78 through an arm 78*a*. The rotary pin 78 is parallel with and separate from the rotation axis 76*a* by a predetermined distance through the arm 78*a*. Further, at the tip of the rotation axis 76*a* is fitted a fan-shaped gear 79 in which a gear portion 79*a* is provided in part of its outer circumference edge. At the center of the fan-shaped gear 79 is provided an engaging slot 79*b* into which the rotation axis 76*a* and rotary pin 78 are inserted. The rotation axis 76*a* and rotary pin 78 are engaged together with the engaging slot 79*b*, whereby the fan-shaped gear 79 is driven by rotation of the rotation axis 76*a* to integrally rotate.

With the gear portion 79*a* of the fan-shaped gear 79 is engaged a pinion gear 80 rotatably supported by an axis 76*c* provided on the flange portion 76*b*. In part of the outer circumference of the pinion gear 80 is provided an arm 80*a*, to which a drive pin 81 projecting toward the power source 76 is provided. Those power source 76, rotary pin 78, fan-shaped gear 79, pinion gear 80, and drive pin 81 constitute a power transmission mechanism 83 to move a filter holder 82.

The fan-shaped gear 79 and the other portions are arranged between the rear barrel 17A and the power source 76 to be positioned such that predetermined performance can be obtained, and are driven. Note that the power transmission mechanism 83 is not limited to the above-described gear train and so on, and various mechanisms capable of transmitting power such as a cam mechanism and a link mechanism can also be employed.

The filter holder 82 holds the infrared cutoff filter 91 to move in the direction intersecting the optical axis L, in which a holding portion 82*a* forming a U-shaped opening where the infrared cutoff filter 91 is installed is provided. On both external surfaces of an open side of the holding portion 82*a*, there is provided a projection 82*b* for fixing a fitting band 84 to close the opening, respectively. On the side opposite to the holding portion 82*a* of the filter holder 82, there is provided a long slot 82*c* with which the drive pin 81 is engaged in a slidable manner.

Furthermore, on the side opposite to the open side of the holding portion 82*a* of the filter holder 82, there is provided a projecting guide strip 82*d* to be guided by a guide portion 75 of the casing 71 when the filter is moved in the direction intersecting the optical axis L. The filter holder 82 can be molded from, for example, polycarbonate resin containing glass fiber and has the strength, a light shielding nature and mass-productivity.

The fitting band 84 is formed of an elastic member such as a rubber elastomer and is provided with a pair of engaging holes 84*a* to be engaged with the projection 82*b*. On the fitting band 84 is provided an urging portion 84*b* for urging the infrared cutoff filter 91 elastically to prevent the falling off when installed. By fastening the fitting band 84 to the open side of the holding portion 82*a* while the infrared cutoff filter 91 is installed therein, the infrared cutoff filter 91 is set in a predetermined position to be held by the filter holder 82.

A method for holding the infrared cutoff filter 91 is not limited to a snap-fit method using the fitting band 84; various methods such as an adhesion method by thermal swaging or by adhesive, and other methods can be employed.

In this example, being held by the filter holder 82 to be moved in the direction intersecting the optical axis L, the infrared cutoff filter 91 is formed independently as a separate member from the optical low-pass filter 85 differently from a conventional collapsible lens.

The optical low-pass filter 85 is also necessary for recording a picture of the image-pickup apparatus during the night shot such as infrared photography. Thus, in this example, the optical low-pass filter 85 is arranged in front of the solid-state imaging device 24 in the direction of the optical axis, which is installed in a center opening of the rear barrel 17A, set in a predetermined position to be fixed.

The above-described power transmission mechanism 83 and the filter holder 82 constitute a move mechanism 86 for moving the infrared cutoff filter 91 between a position on the optical axis and a position off the optical axis. The move mechanism 86 and the casing 71 constitute an escape mechanism 88 for linearly moving the infrared cutoff filter 91 from the predetermined position on the optical axis in the direction at right angles thereto to make the filter escape to the predetermined position off the optical axis.

The operation of the escape mechanism 88 will be described briefly as follows. Description will be given first about the case where the infrared cutoff filter 91 is moved from a position on the optical axis to a position off the optical axis.

To start with, the driving source 76 is driven to rotate the rotation axis 76 and rotary pin 78 in a predetermined direction of rotation. This makes the fan-shaped gear 79 rotate in the same direction and to the same amount, which is made to rotate with the rotation axis 76a and the like as one body. With the rotation of the fan-shaped gear 79, the pinion gear 80 engaged with the gear portion 79a rotates in the opposite direction by the amount corresponding to the number of engaged gears.

With the drive pin 81 rotating around the axis 76c, the drive pin 81 moves along the long hole 82c and makes the filter holder 82 move in a direction of drawing the holder out from the filter-retracting portion 72. Accordingly, the filter holder 82 guided by the guide portion 75 moves in the direction intersecting the optical axis. As a result, the infrared cutoff filter 91 held by the filter holder 82 is linearly moved in the orthogonal direction from the predetermined position on the optical axis to the predetermined position off the optical axis.

On the other hand, in the case where the infrared cutoff filter 91 is moved from the predetermined position off the optical axis to the predetermined position on the optical axis, reverse operation to the above-described escape operation is performed. With that operation, the infrared cutoff filter 91 can be moved to the predetermined position on the optical axis.

On the front surface of the rear barrel 17A in which the infrared cutoff filter 91 and the like are installed, a rear end of the fixed ring 15 is brought to contact and is fixed by fastening means such as fitting screws or the like to be integrated as one body. For this purpose, as shown in FIG. 17, the rear end of the fixed ring 15 is provided with a plurality of screw-receiving portions 15c into which the fitting screws are inserted, and also the rear barrel 17A is provided with the same number of corresponding recesses 17A as that of those screw-receiving portions 15c. By fitting each of the screw-receiving portions 15c into each of the recesses 17a, the fixed ring 15 is positioned with respect to the rear barrel 17A. By screwing in that state, the fixed ring 15 is fastened to the rear barrel 17A to be unified as one body.

By virtue of the above-described structure, the collapsible lens 70 can perform the above-described "night-shot function" and "night-framing function". Specifically, when the collapsible lens is used as the optical lens from the collapsed state shown in FIG. 14A through the wide state shown in FIG. 14B to the telephoto state shown in FIG. 14C, by setting the infrared cutoff filter 91 on and off the optical axis, "night shot" and "night framing" of the infrared photography can be performed.

FIGS. 15A and 15B explain the operation of taking in and out the infrared cutoff filter 91 of the collapsible lens 70; FIG. 15A shows a state in which the infrared cutoff filter 91 is set in the predetermined position on the optical axis; and FIG. 15B shows a state in which the infrared cutoff filter is completely moved off the optical axis. In the same figures, a mark H indicates a direction of the movement of infrared cutoff filter 91.

As the image-pickup apparatus including the above-described collapsible optical unit, there is, for example, the one disclosed in Patent Literature 1. In the Patent Literature 1 is described an optical apparatus such as a camera or the like capable of moving an optical system between a working position and a retracted position.

This optical apparatus is characterized by including a first lens unit constituting an optical system, a first motor for driving the first lens unit, a second lens unit constituting the optical system, which is provided behind the first lens unit, a second motor for driving the second lens unit, and control means for controlling the first and second motors to retract the second lens unit in response to a retract-instruction of the optical system, to start retracting the first lens unit after the second lens unit has been retracted, and to retract the first lens unit into a space made by retracting the second lens unit.

Further, as the image-pickup apparatus provided with the infrared cutoff filter, there is, for example, the one disclosed in Patent Literature 2. In this Patent Literature 2 is described an image-pickup apparatus having an image-pickup device capable of photographing in the range of visible light and infrared rays.

This image-pickup apparatus is characterized by including, in the image-pickup apparatus having the image-pickup device capable of photographing in the range of visible light and infrared rays, an infrared cutoff filter capable of being arranged on the optical path and off the optical path, signal processing means for processing a video signal obtained by the image-pickup device, detection means for detecting the brightness when the video signal is obtained by taking the picture, and control means for estimating based on a result detected by the detection means whether it is erroneous operation or not and informing a user of the erroneous operation.

Patent Literature 1

Japanese Published Patent Application No. 2000-194046 (pages 3 to 5, FIG. 1 and so on)

Patent Literature 2

Japanese Published Patent Application No. 2000-261716 (page 2, FIG. 1)

However, in a "collapsible lens having the night-shot function, capable of photographing at night" as described above with reference to FIGS. 4A to 14C, since the taking-in and taking-out mechanism of the infrared cutoff filter is added, when compared with a "collapsible lens having no night-shot function, incapable of photographing at night", a total length of lenses when collapsed becomes thicker, which poses a problem.

This point will be described in detail; FIG. 4A shows a "collapsible lens without the night-shot function (hereinafter referred to as a "X type")"; FIG. 4B shows a "collapsible lens according to prior art, having the night-shot function (hereinafter referred to as a "Y type")"; and FIG. 4C shows a "collapsible lens according to the present invention, having the night-shot function (hereinafter referred to as "Z type")".

As is clear from FIGS. 4A and 4B, comparing the X-type collapsible lens with the Y-type collapsible lens, the thickness T1 of the Y-type collapsible lens increases evidently by that of the escape mechanism 88.

Further, as shown in FIG. 4B, in the "collapsible lens having the night-shot function, capable of photographing at night", when the power supply suddenly stops at the time collapsed because user turns off the power supply or the battery is suddenly dead or a battery box is opened, it is assumed that the user may forcibly give an external force to the collapsible lens by manual operation for executing the collapsing operation forcibly.

In such case, since the electric power is not supplied to the take-in and take-out mechanism of the infrared cutoff filter, it is impossible to make the infrared cutoff filter escape off the optical axis synchronously with the collapsing operation. As a result, there is a risk that retracted parts forced to be retracted by the external force may contact or interfere with other parts, so that the infrared cutoff filter, filter holder thereof and drive mechanism thereof, or a drive mechanism of the collapsible lens itself such as a cam ring may be destroyed structurally, which poses another problem.

The present invention is made in order to solve the above-described problems and aims to provide an optical unit and an image-pickup apparatus having the optical unit that are capable of making a collapsible lens thinner than before.

Further, the present invention also aims to solve the above-described problems by providing a mechanism for forcibly retreating the optical filter from the optical axis to be off the optical axis, if the user forces the collapsing operation to be performed or such abnormality occurs that the escape mechanism for making the optical filter escape from the optical axis to be off the optical axis does not work and so on, when the collapsible lens is retracted or collapsed.

DISCLOSURE OF THE INVENTION

In order to attain the above object, the optical unit according to the present application is a collapsible optical unit having a fixed barrel, at least one lens barrel movable along the direction of its optical axis with respect to the fixed barrel, and a lens and an optical filter provided between the fixed barrel and lens barrel, including an escape mechanism by which the optical filter is moved in the direction intersecting the optical axis to escape from the optical axis at the time when collapsed to make the lens barrel approach the optical filter, wherein the lens can be retracted in a position on the optical axis after the optical filter has moved.

Furthermore, the optical unit according to the present application is a collapsible optical unit having a fixed barrel, at least one lens barrel movable along the direction of its optical axis with respect to the fixed barrel, and a lens and an optical filter provided between the fixed barrel and lens barrel, including: an escape mechanism by which the optical filter is moved in the direction intersecting the optical axis to escape from the optical axis at the time when collapsed to make the lens barrel approach the optical filter, and a forcible escape mechanism by which the optical filter is made to escape forcibly off the optical axis when the optical filter cannot retreat off the optical axis by the escape mechanism.

Moreover, an image-pickup apparatus having the optical unit according to the present application includes a collapsible optical unit including a fixed barrel, at least one lens barrel movable along the direction of the optical axis with respect to the fixed barrel, a lens and an optical filter provided between the fixed barrel and lens barrel, and an escape mechanism by which the optical filter is made to move in the direction intersecting the optical axis and to escape off the optical axis, and the image-pickup apparatus is a camera apparatus such as a digital still camera and a digital video camera capable of retracting the lens in a position on the optical axis after the optical filter has moved.

Furthermore, an image-pickup apparatus having the optical unit according to the present application is a camera apparatus such as a digital still camera and digital video camera including the collapsible optical unit including a fixed barrel, at least one lens barrel movable along the direction of the optical axis with respect to the fixed barrel, a lens and an optical filter provided between the fixed barrel and lens barrel, an escape mechanism by which the optical filter is made to move in the direction intersecting the optical axis and to escape off the optical axis at the time when collapsed to make the lens barrel approach the optical filter, and a forcible escape mechanism by which the optical filter is made to escape forcibly off the optical axis when the escape mechanism cannot make the optical filter escape off the optical axis.

The optical unit according to this application makes the optical filter escape in the direction intersecting the optical axis when a lens barrel is retracted to form a space of a predetermined size in a position on the optical axis after the filter moved, and retracts the lens of lens barrel into the space. Thus, by retracting the lens in the space after the optical filter has moved, the total length of the collapsible lens of the optical unit can be made thin, thereby allowing the optical unit to be small-sized.

In addition, by providing the forcible escape mechanism other than the escape mechanism, the optical filter can be made to escape forcibly from a position on the optical axis to a position off the optical axis by the forcible escape mechanism in forcible collapsing operation by a user or in malfunction of the escape mechanism when collapsed, thereby allowing the optical filter such as an infrared cutoff filter and its holding member, its drive mechanism, or a drive mechanism of the collapsible lens itself such as a cam ring to be prevented from being broken in structure.

Moreover, according to the image-pickup apparatus including the optical unit of this application, since the optical unit that can be made small in size can be used, the apparatus can be employed as a camera apparatus such as a digital still camera and digital video camera, and the whole of the image-pickup apparatus can be made small in size and thin in profile.

Furthermore, by providing the forcible escape mechanism in addition to the escape mechanism, a risk that the structure of optical unit may be destroyed due to forcible collapsing operation by a user or due to malfunction of the escape mechanism at the collapsing time can be reduced, which enables the image-pickup apparatus such as a digital still camera and digital video camera having a structure strong against destruction to be provided.

BRIEF DESCRIPTION OF DRAWINGS

FIG. 1A is a sectional view showing a collapsed state that is a retracted state of a collapsible lens when not used according to a first embodiment of the optical unit of the present invention;

FIG. 1B is a sectional view showing a wide angle state of the collapsible lens according to the first embodiment of the optical unit of the present invention;

FIG. 1C is a sectional view showing a telephoto state of the collapsible lens according to the first embodiment of the optical unit of the present invention;

BEST MODE FOR CARRYING OUT THE INVENTION

Hereinafter, embodiments of a collapsible optical unit and an image-pickup apparatus including the optical unit according to the present invention will be described with reference to the drawings.

Figure 2:
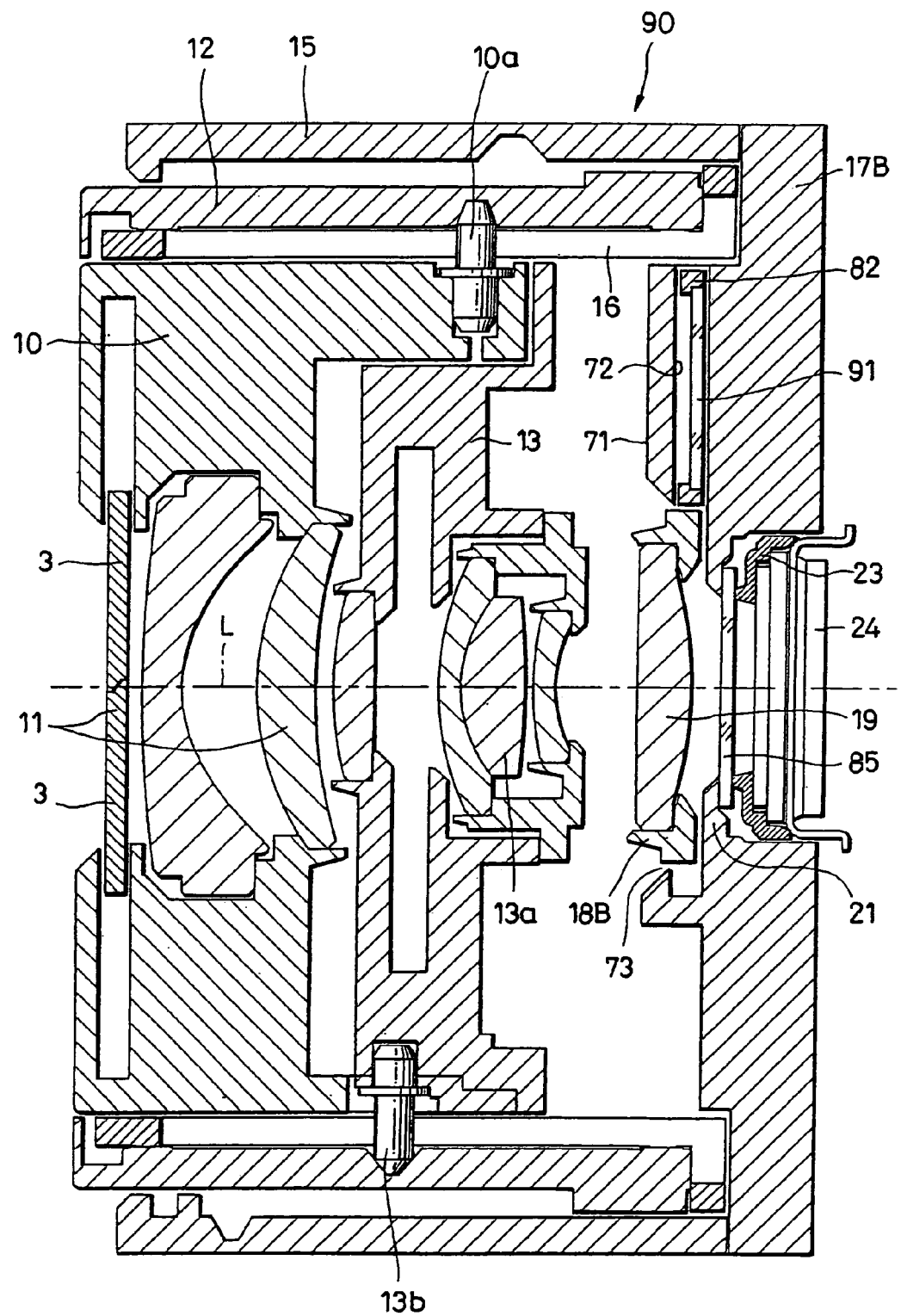
FIG. 2 is an enlarged sectional view of FIG. 1A.
Figure 3A:
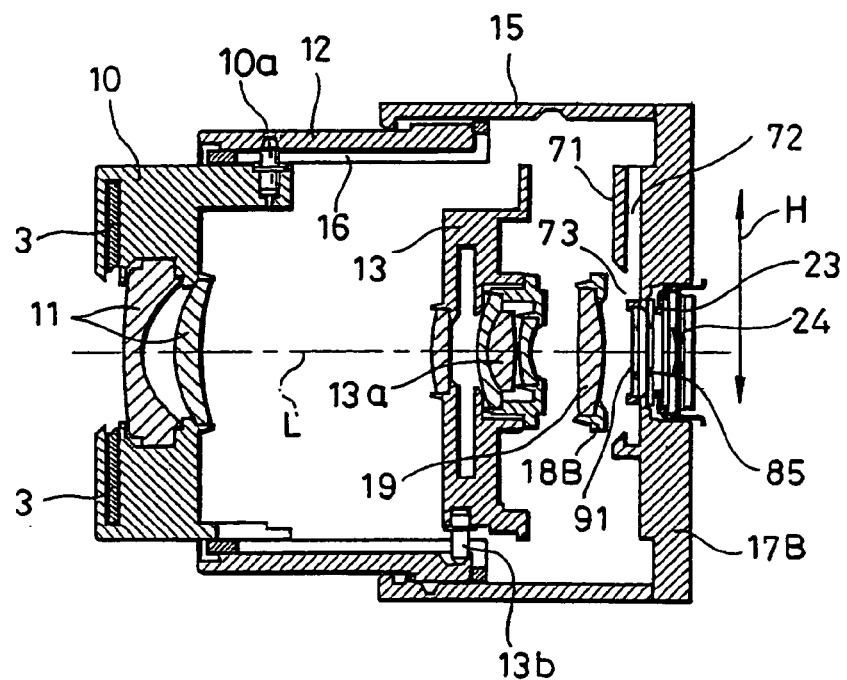
FIG. 3A is a sectional view for explaining the operation of taking an infrared cutoff filter in and out according to the first embodiment of the optical unit of the present invention, which shows the state where the filter is positioned on the optical axis.
Figure 3B:
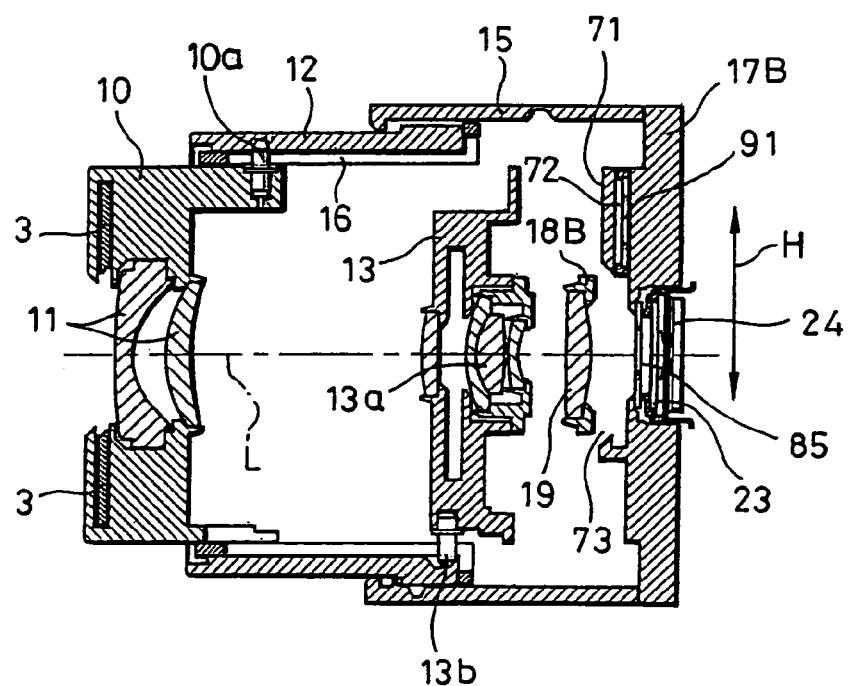
FIG. 3B is a sectional view for explaining the operation of taking the infrared cutoff filter in and out according to the first embodiment of the optical unit of the present invention, which shows the state where the filter is moved off the optical axis.

FIGS. 1A to 1C are sectional views of a first embodiment of the collapsible lens according to the present application, in which FIG. 1A shows the retracted state, that is, a collapsed position of the lens when not used; FIG. 1B shows the wide angle position; and FIG. 1C shows the telephoto position. FIG. 2 is an enlarged sectional view of FIG. 1A. Further, FIGS. 3A and 3B are sectional views for explaining the operation of taking the infrared cutoff filter in and out.

Figure 12A:
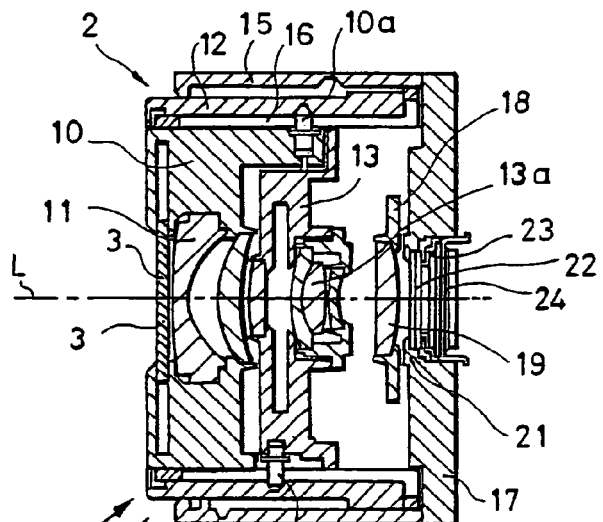
FIG. 12A is a sectional view showing the collapsed state of a conventional collapsible lens having no night-shot function.
Figure 12B:
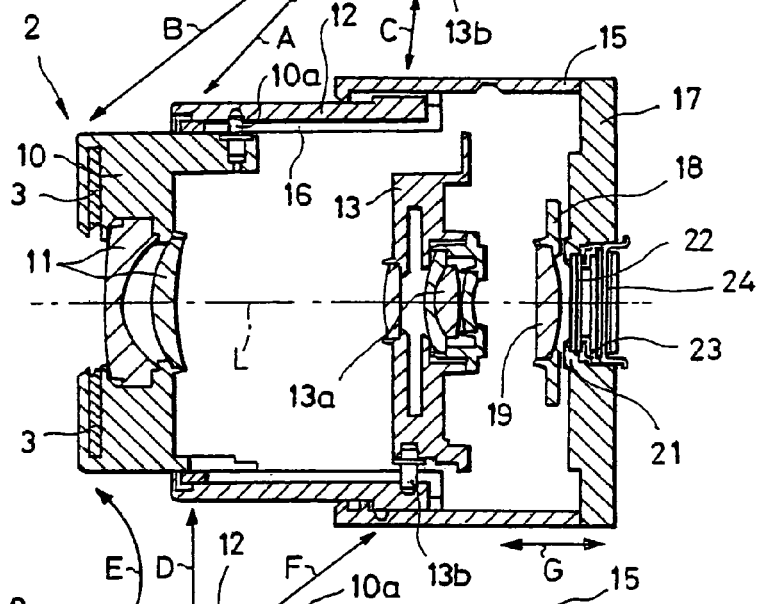
FIG. 12B is a sectional view showing the wide state of the conventional collapsible lens having no night-shot function.
Figure 12C:
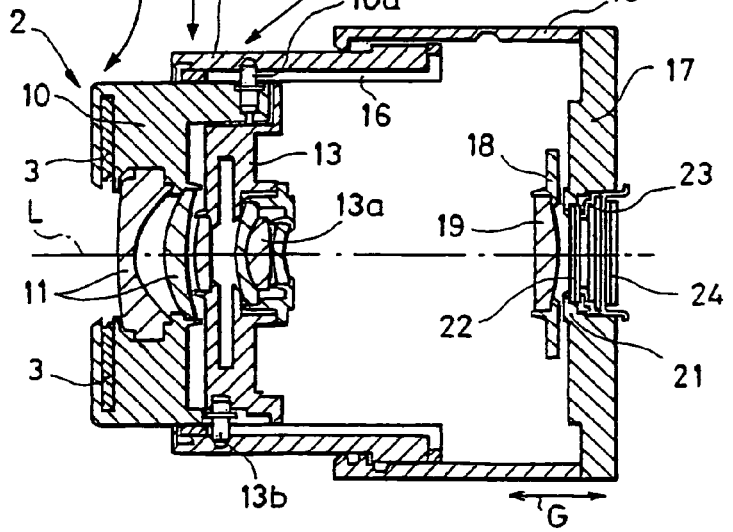
FIG. 12C is a sectional view showing the telephoto state of the conventional collapsible lens having no night-shot function.
Figure 13:
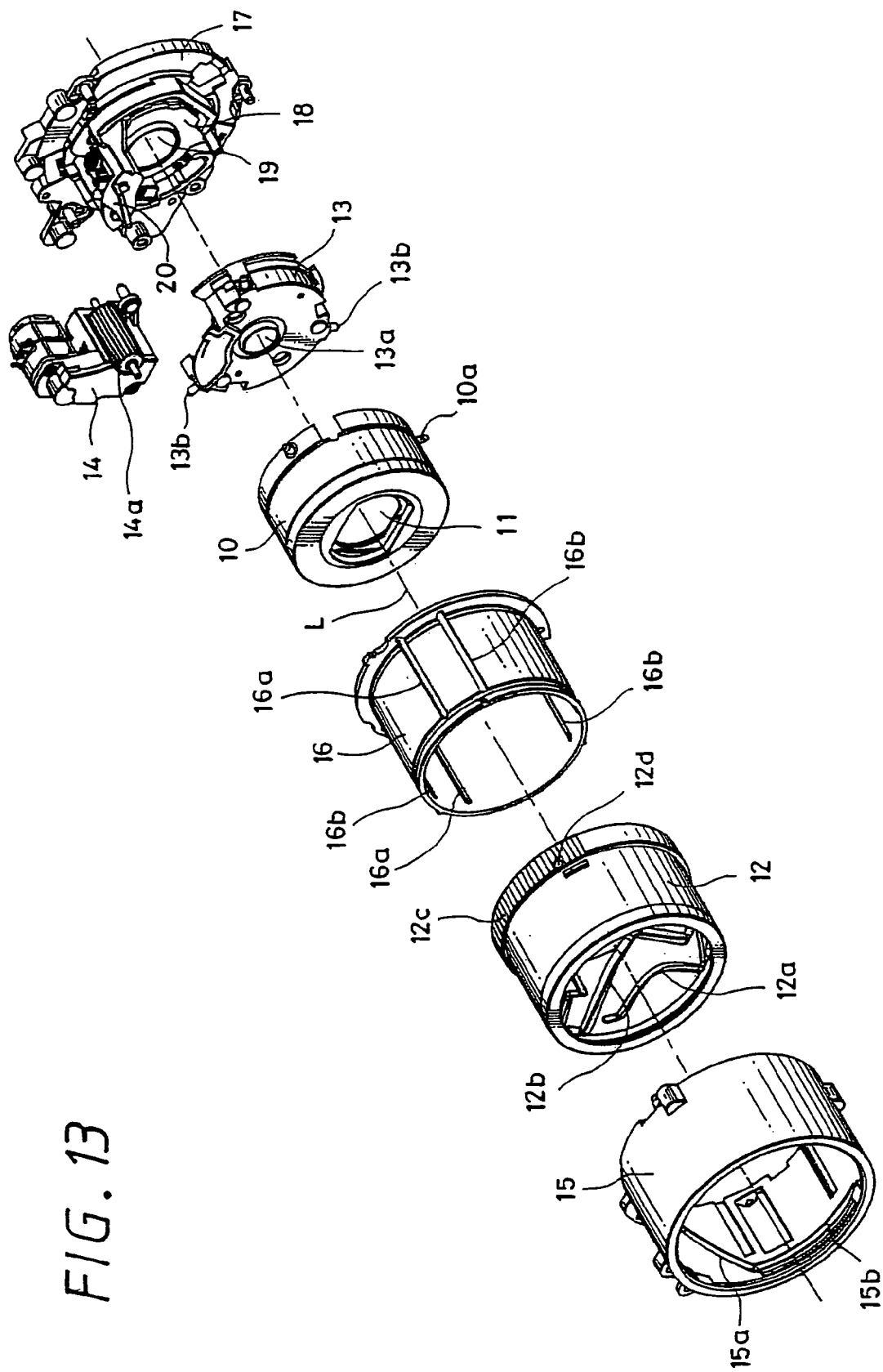
FIG. 13 is an exploded perspective view of the conventional collapsible lens shown in FIG. 12.

In this context, similarly to the explanation with reference to FIGS. 12A to 12C, the first group lens frame 10 holding a plurality of lenses 11 and the second group lens frame 13 holding a plurality of lenses 13a are moved from the collapsed position in FIG. 1A to the wide position in FIG. 1B and from the wide position in FIG. 1B to the telephoto position in FIG. 1C, by driving the cam ring 12 to rotate, when the zooming operation and the wide operation reverse thereto are performed.

Further, the first characteristic of the present application is that when the optical unit is collapsed, the optical filter formed of an optical low-pass filter, an infrared cutoff filter, or the like is made to escape in the direction intersecting the optical axis L and the third group lens frame such as a focusing lens or the like is made to retract into a space made by the escape, thereby enabling the total length of the collapsible lens to be thin.

Figure 14A:
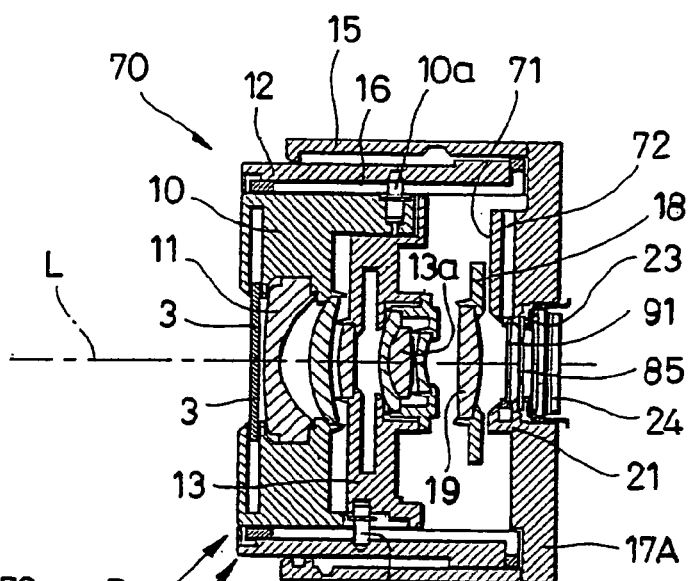
FIG. 14A is a sectional view showing the collapsed state of a collapsible lens according to prior art having the night-shot function.
Figure 14B:
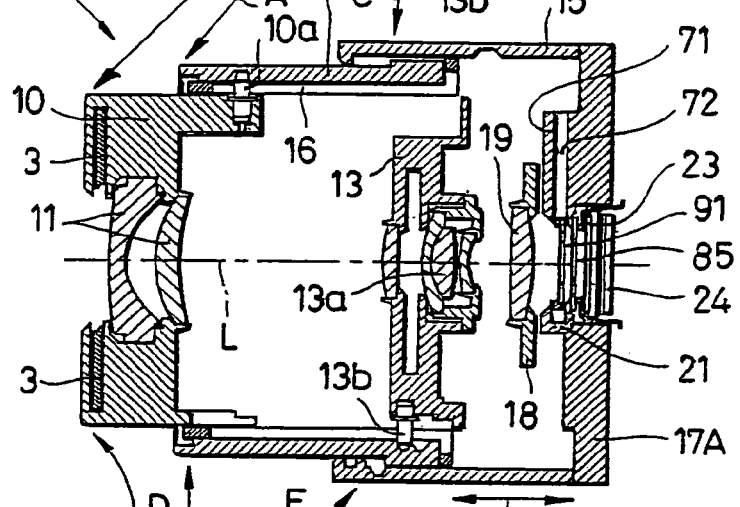
FIG. 14B is a sectional view showing the wide state of the collapsible lens according to prior art having the night-shot function.
Figure 14C:
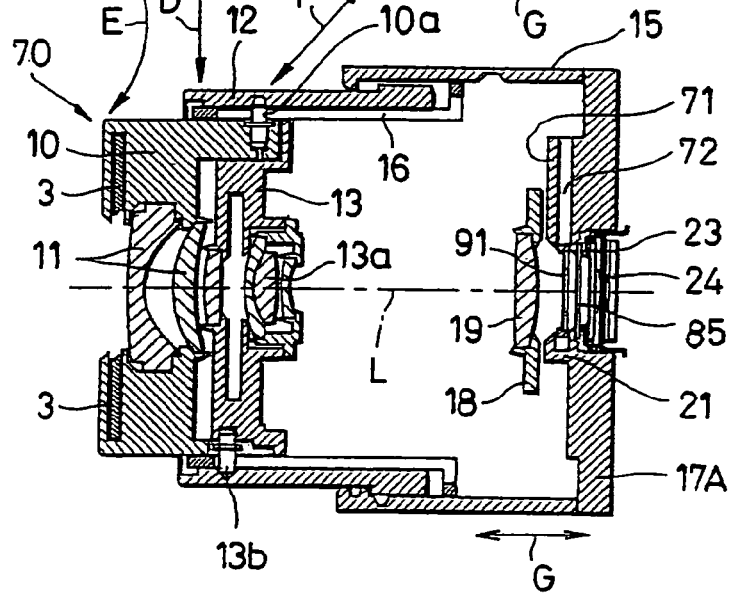
FIG. 14C is a sectional view showing the telephoto state of the collapsible lens according to prior art having the night-shot function.
Figure 15A:
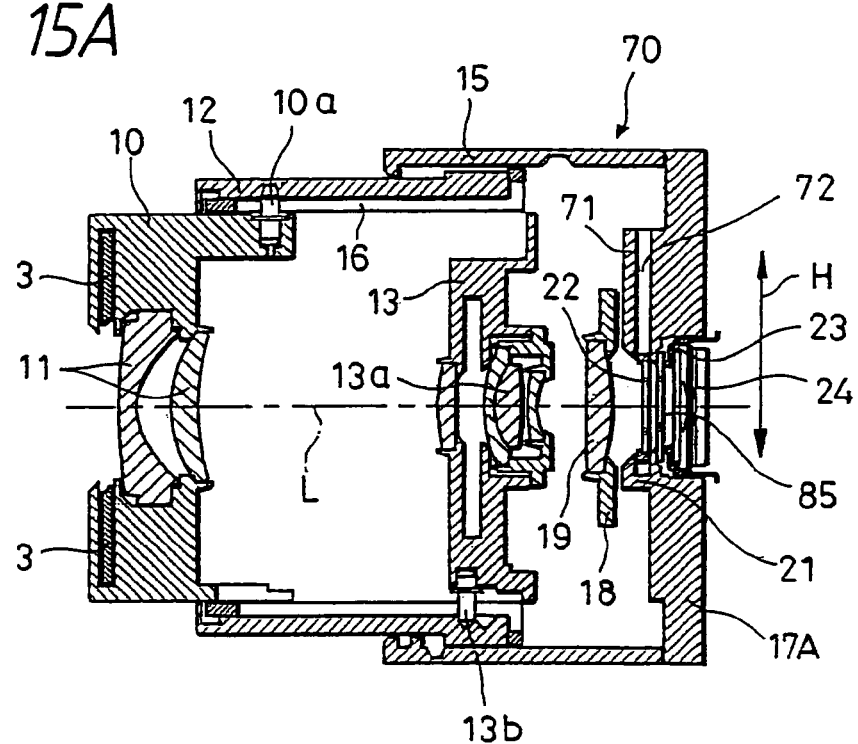
FIG. 15A is a sectional view for explaining the operation of taking in and out the infrared cutoff filter of the collapsible lens shown in FIG. 14 according to prior art having the night-shot function, which shows the state where the filter is positioned on the optical axis.
Figure 15B:
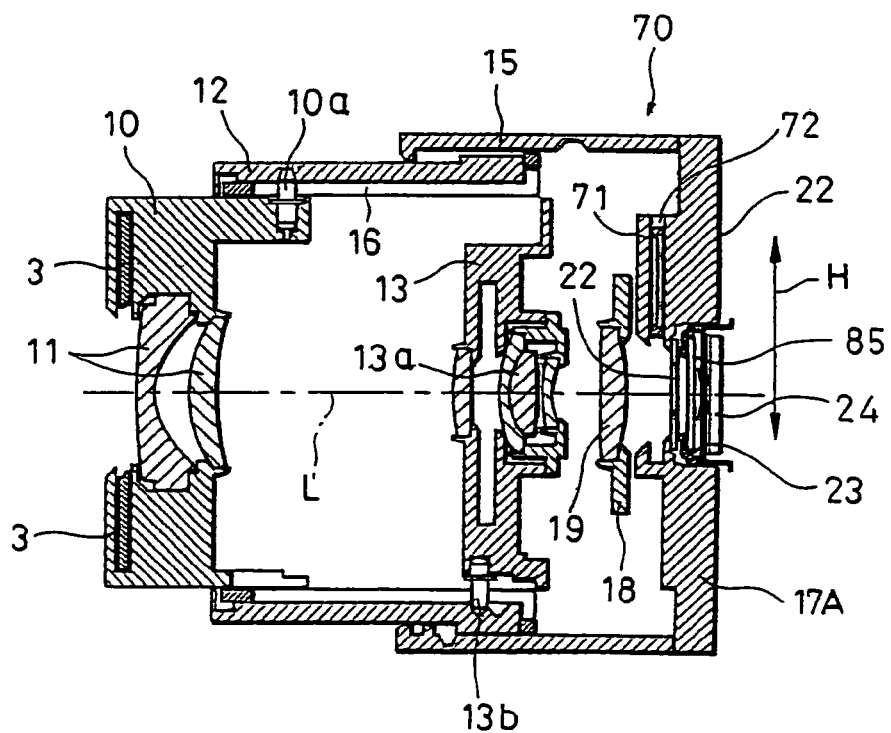
FIG. 15B is a sectional view for explaining the operation of taking in and out the infrared cutoff filter of the collapsible lens shown in FIG. 14 according to prior art having the night-shot function, which shows the state where the filter is moved off the optical axis.

The escape mechanism 88 of the optical filter will be described below with reference to FIGS. 1A to 1C, FIG. 2 as well as FIGS. 3A and 3B. Note that, with respect to FIGS. 1A to 1C, FIG. 2, and FIGS. 3A and 3B, the same parts as those described with reference to FIGS. 12A to 12C, FIG. 13, FIGS. 14A to 14C as well as FIGS. 15A and 15B are denoted by the same signs to be explained.

A collapsible lens (image-pickup lens portion) 90 according to the first embodiment has approximately the same structure as that of the collapsible lens having a "night-shot function capable of photographing at night", described with reference to FIGS. 14A to 14C, thus, hereupon the whole structure will be described schematically and discriminative points will be described in detail.

In FIGS. 1A to 1C, a reference numeral 10 denotes the first group lens frame holding a plurality of lenses 11; a reference numeral 12 denotes the cam ring movably supporting the first group lens frame 10 in the direction of the optical axis; a reference numeral 13 denotes the second group lens frame holding a plurality of lenses 13a; and a reference numeral 16 denotes the straight forward guide ring movably supporting the second group lens frame 13 in the direction of the optical axis. Further, a reference numeral 15 denotes the fixed ring movably supporting the cam ring 12 in the direction of the optical axis; and the fixed ring 15 is integrally fixed to the front surface of a rear barrel 17B.

The rear-barrel 17B holds the optical low-pass filter 85 and the solid-state imaging device 24, and the seal rubber 23 is provided in between. In front of the optical low-pass filter 85, the infrared cutoff filter 91 as a specific example of the optical filter is arranged to be linearly movable between a position on the optical axis L and a position off the optical axis. Further, in front of the infrared cutoff filter 91 on the optical axis is arranged the lens 19 held by a third group lens frame 18B.

While the third group lens frame 18B has the same structure as that of the above-described third group lens frame 18, it is preferable to make the lens frame small in the radial direction within a range not incurring unfavorable effects on the optical performance, and to form the lens frame such that the infrared cutoff filter 91 and the filter holder 82 can easily escape in the direction intersecting the optical axis L. In this case, it is also efficient to provide such a cutout in the third group lens frame 18B as avoids the filter holder 82 escaping in the direction intersecting the optical axis L.

While the structure of the rear barrel 17B is also the same as that of the above-described rear barrel 17A, the rear barrel is preferable to be provided as follows in order to make the filter holder 82 escape in the direction intersecting the optical axis L and to make the third group lens frame 18B retract in a direction of the solid-state imaging device 24 such as CCD and CMOS.

First, to make the filter holder 82 escape in the direction intersecting the optical axis L, an entrance of the escape exit 74 is made larger than before. Secondly, to retract the third group lens frame 18B into a space made after the filter holder 82 has escaped in the direction intersecting the optical axis L, the opening 73 is made larger than before. The opening 73 may also have a function as a fixed stop, however, since this function can be borne by another opening (a portion fixing the optical low-pass filter 85, for example), it is possible to make the opening 73 large in design.

Next, the operation of this embodiment will be described. While employed as the optical lens from the collapsed state in FIG. 1A through the wide state in FIG. 1B to the telephoto state in FIG. 1C, by setting the infrared cutoff filter 91 on and off the optical axis L, the infrared function is provided to perform the infrared photography (refer to FIGS. 3A and 3B).

In the collapsing operation of the collapsible lens 90, as shown in FIG. 1A, by giving power from the power source 76 to the filter holder 82, the infrared cutoff filter 91 can escape in the direction intersecting the optical axis L (arrow mark H) through the filter holder 82. After that, the third group lens frame 18B is retracted into the space made by making the infrared cutoff filter 91 escape in the direction intersecting the optical axis L (arrow mark I). This makes the third group lens frame 18B retracted into a deeper position than before, so that the lens 19 is collapsed to be thinner than before.

Furthermore, since the third group lens frame 18B is collapsed more thinly than before, the first group lens frame 10, the second group lens frame 13 and the straight forward guide ring 16 can move along a predetermined cam curve and retract into the resulting vacant space to be superimposed (arrow marks A, B and C).

Figure 4A:
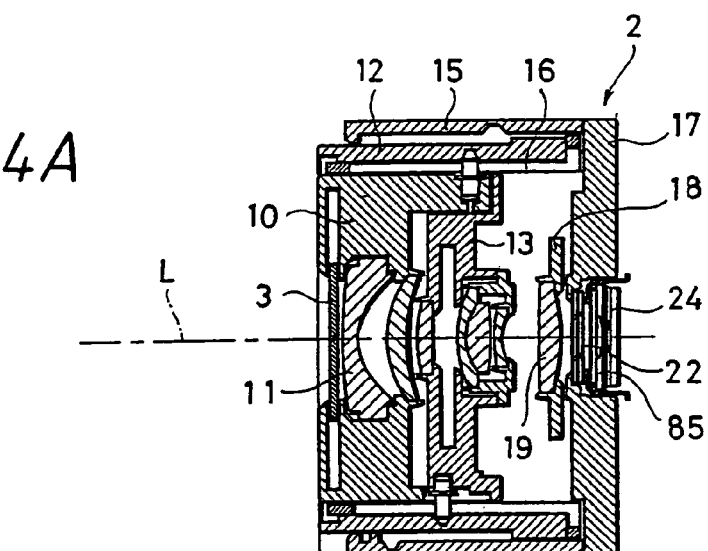
FIG. 4A is a sectional view showing a collapsible lens of a conventional optical unit having no night-shot function.
Figure 4B:
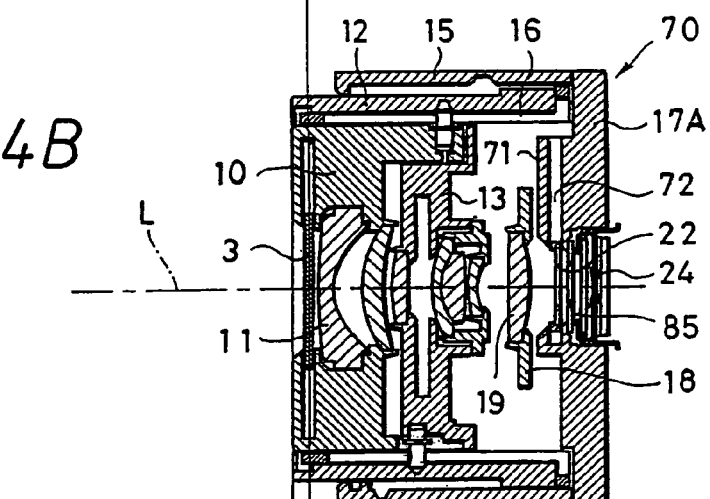
FIG. 4B is a sectional view showing a collapsible lens of a prior-art optical unit having the night-shot function.
Figure 4C:
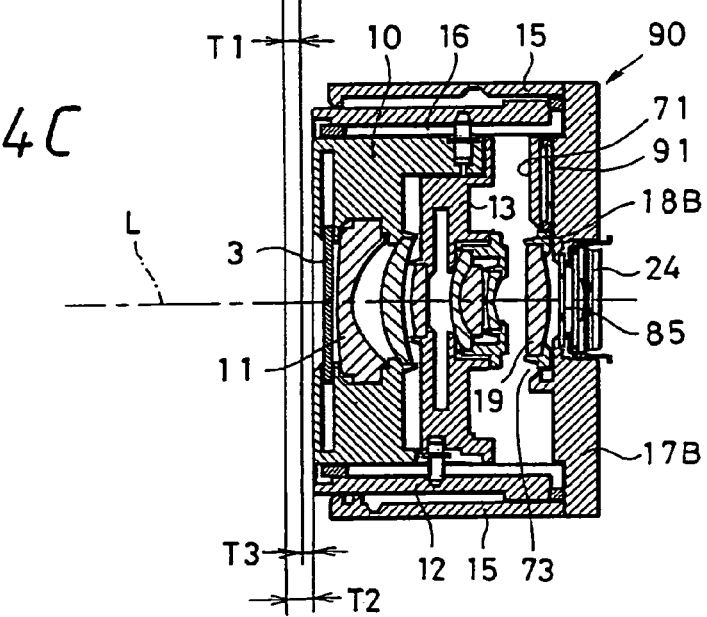
FIG. 4C is a sectional view showing a collapsible lens according to the first embodiment of the optical unit of the present invention having the night-shot function.

Thus, as is clear from FIGS. 4A to 4C showing relations among the three types, comparing the X-type collapsible lens (FIG. 4A) with the Y-type collapsible lens (FIG. 4B), it is understood that the total length of the Y-type collapsible lens increases by the thickness T1 of the escape mechanism 88. On the other hand, comparing the Y-type collapsible lens with the Z-type collapsible lens (FIG. 4C), it is understood that, although both the lenses use the infrared cutoff filter, the total length of the Z-type collapsible lens becomes thinner by the thickness T2. Further, comparing the X-type collapsible lens with the Z-type collapsible lens, although the infrared cutoff filter 22 is added, the total length of Z-type collapsible lens becomes thinner by the thickness T3.

According to the collapsible lens 90 of this embodiment, as compared with a prior-art or conventional "collapsible lens having the night-shot function capable of photographing at night", a space for retraction is efficiently made and is used to retract the lens frames (FIGS. 4A to 4C). This enables the total length of the collapsible lens 90 to be short and thin.

In addition, when compared with the conventional "collapsible lens without night-shot function incapable of photographing at night", since the retracting space is made and utilized efficiently by making the infrared cutoff filter escape in the direction intersecting the optical axis L, the total length of the collapsible lens 90 can be made short to be thin.

Figure 5A:
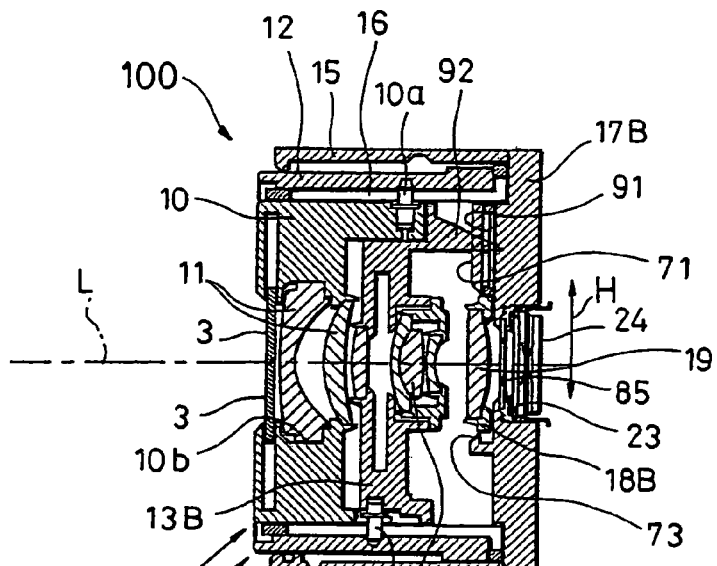
FIG. 5A is a sectional view showing a collapsed state that is a retracted state of a collapsible lens when not used according to a second embodiment of the optical unit of the present invention.
Figure 5B:
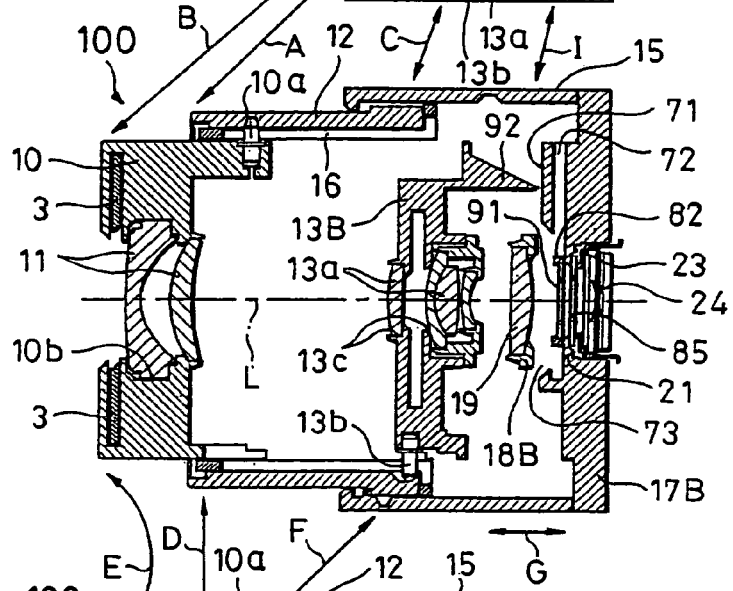
FIG. 5B is a sectional view showing a wide angle state of the collapsible lens according to the second embodiment of the optical unit of the present invention.
Figure 5C:
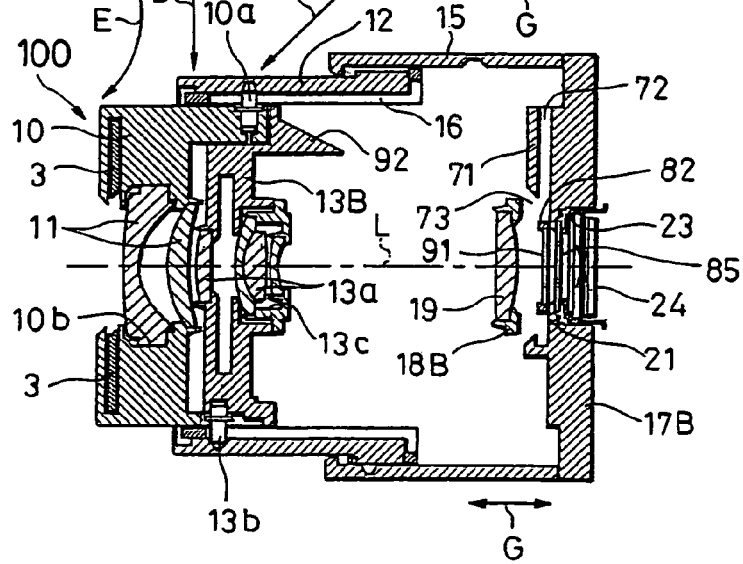
FIG. 5C is a sectional view showing a telephoto state of the collapsible lens according to the second embodiment of the optical unit of the present invention.
Figure 6A:
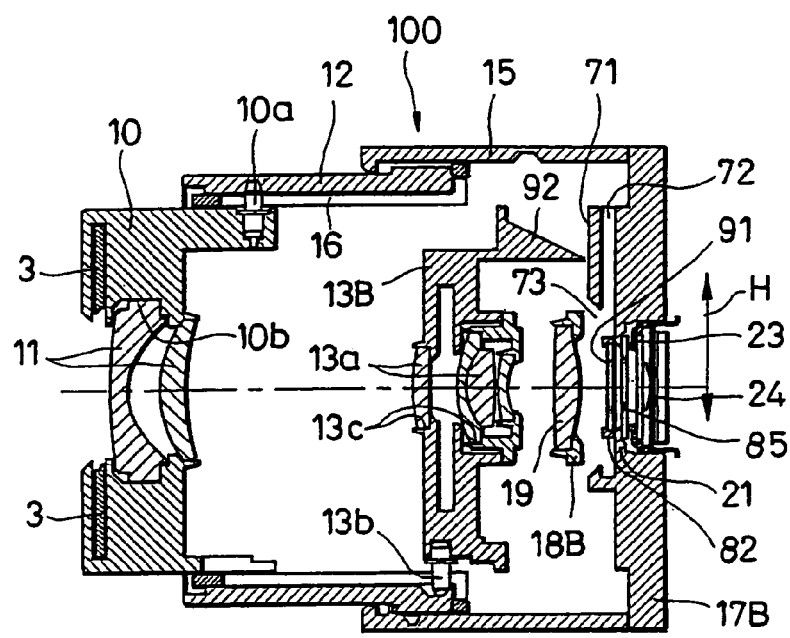
FIG. 6A is a sectional view for explaining the operation of taking the infrared cutoff filter in and out according to the second embodiment of the optical unit of the present invention, which shows the state where the filter is positioned on the optical axis.
Figure 6B:
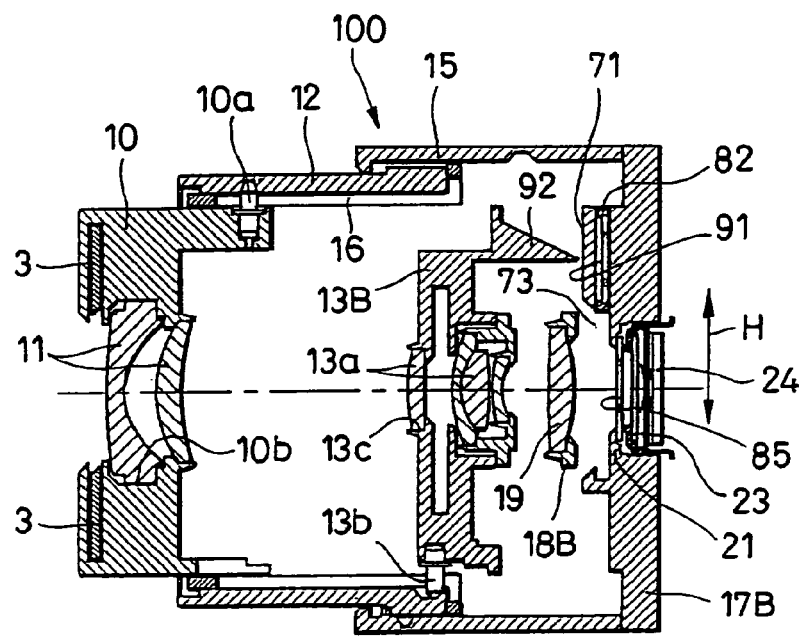
FIG. 6B is a sectional view for explaining the operation of taking the infrared cutoff filter in and out according to the second embodiment of the optical unit of the present invention, which shows the state where the filter is moved off the optical axis.
Figure 7:
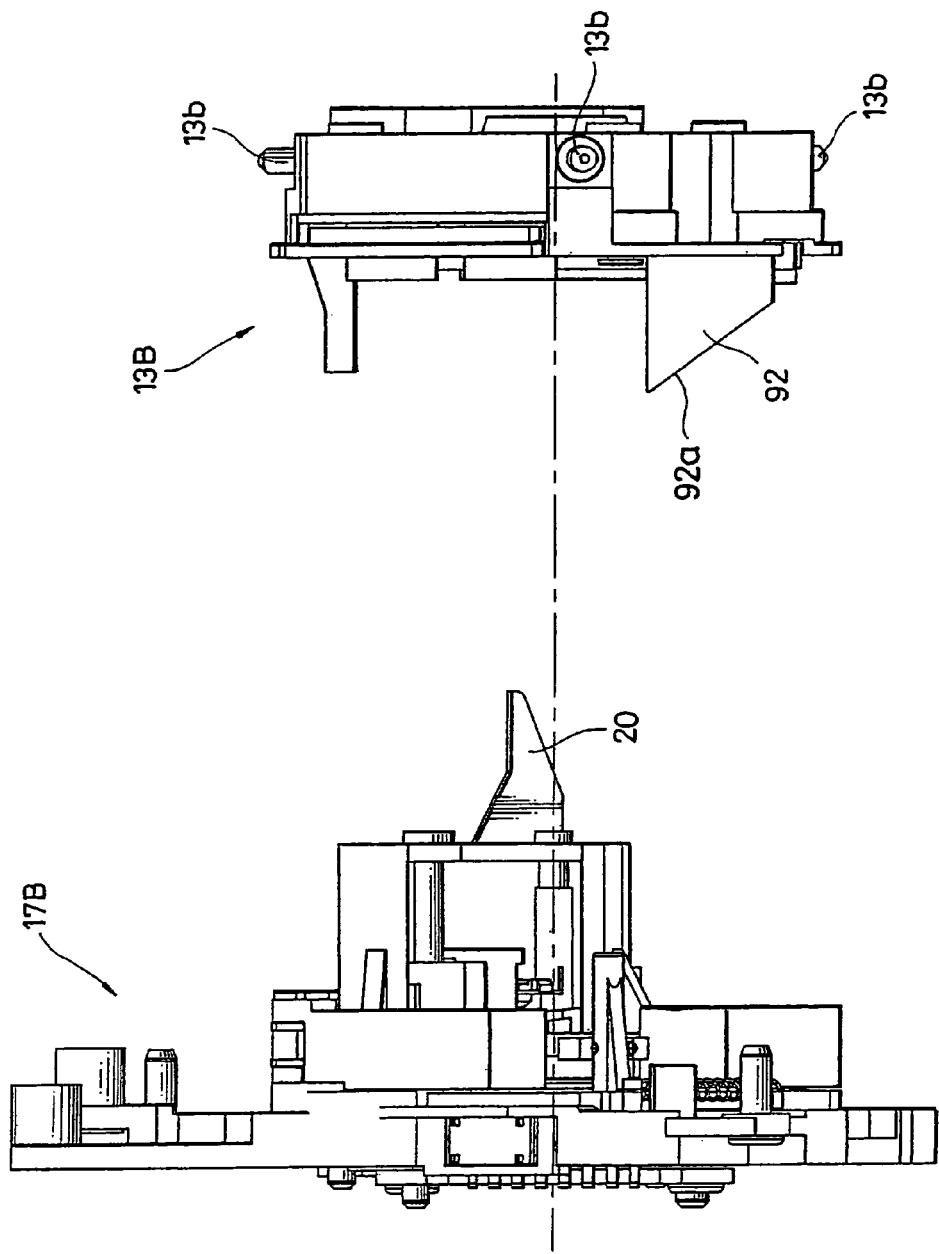
FIG. 7 is a side view showing a second group lens frame and a rear barrel of the collapsible lens according to the second embodiment of the optical unit of the present invention.
Figure 8:
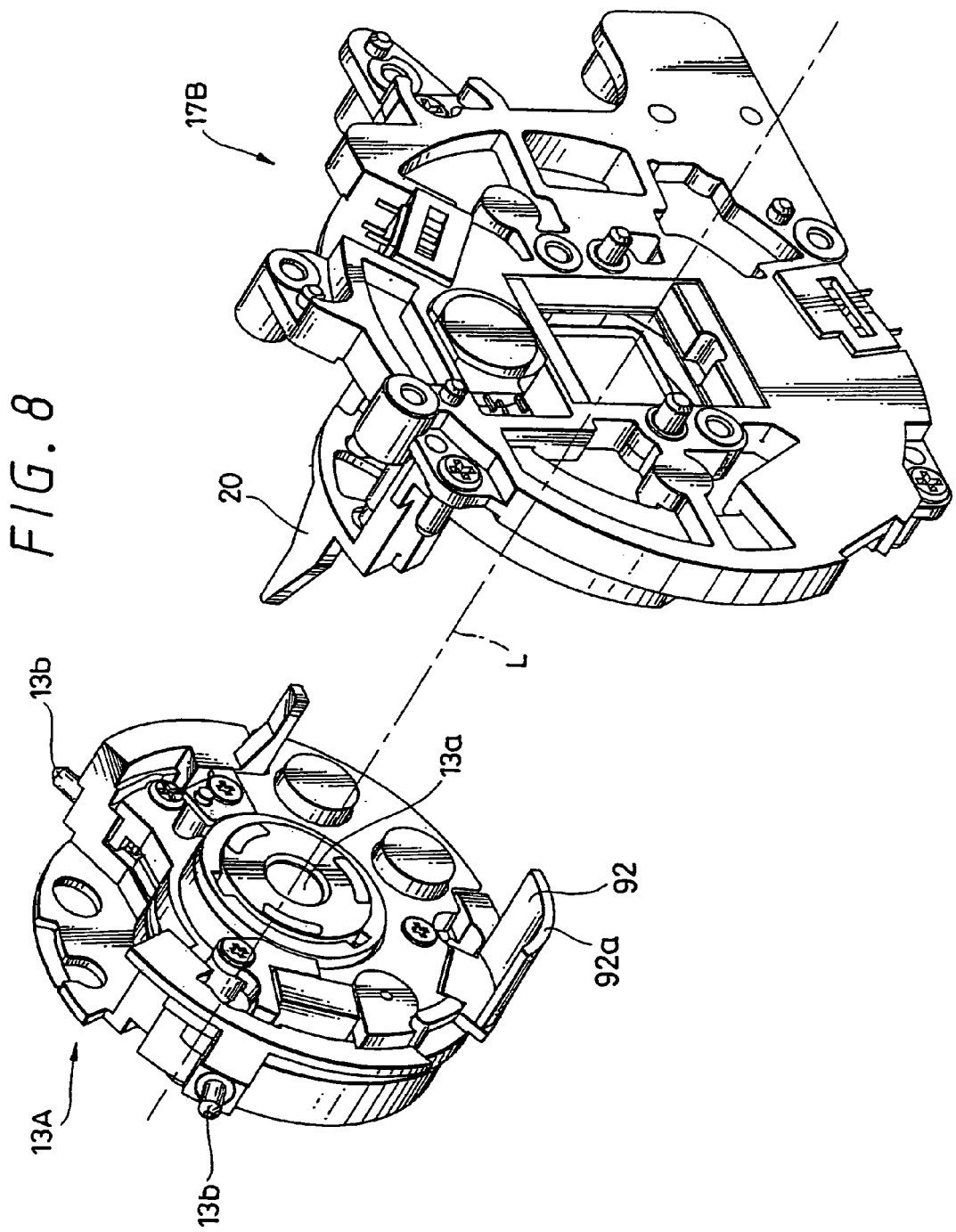
FIG. 8 is a perspective view showing the second group lens frame and the rear barrel of the collapsible lens according to the second embodiment of the present invention.
Figure 9:
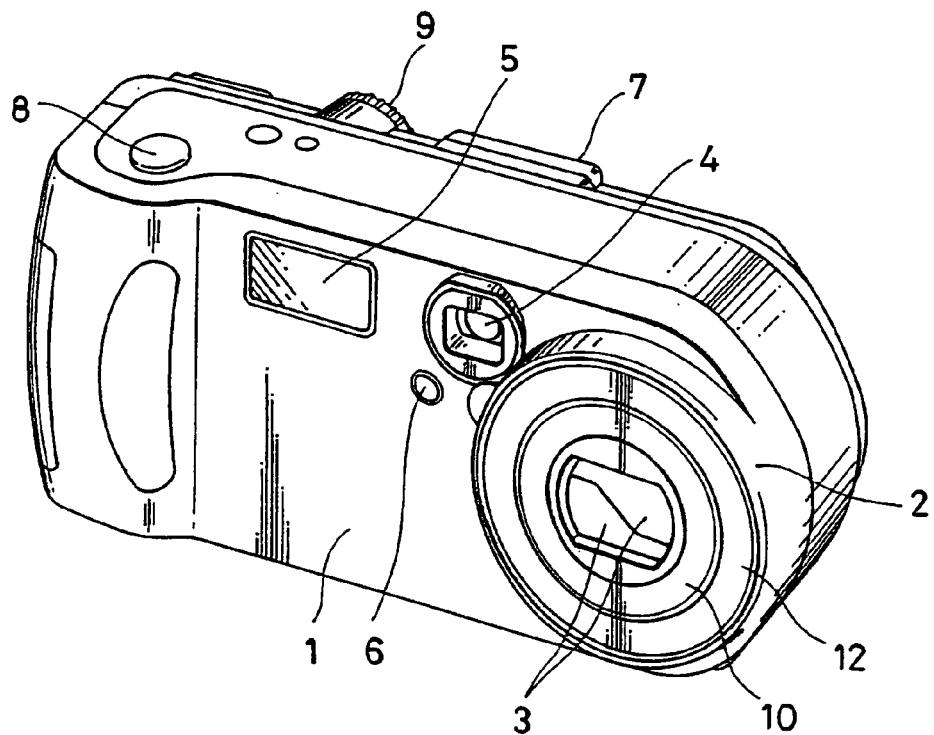
FIG. 9 is a perspective view showing an external appearance of an embodiment of a digital still camera whose collapsible lens of the optical unit is in a collapsed state.
Figure 10:
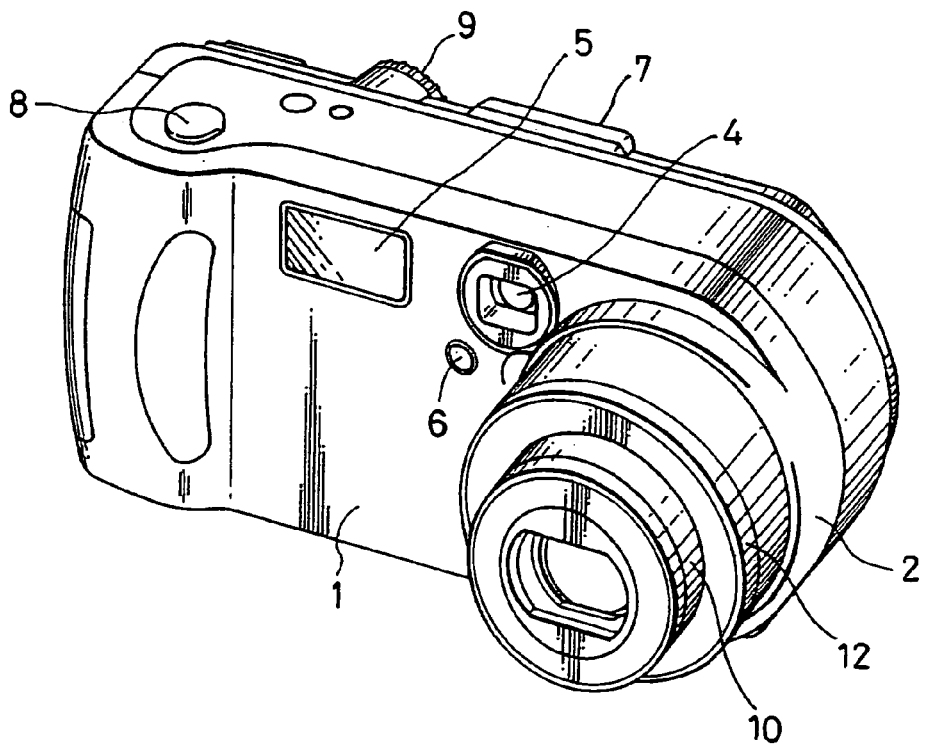
FIG. 10 is a perspective view showing an external appearance of an embodiment of a digital still camera whose collapsible lens of the optical unit is elongated into the wide state or the telephoto state.
Figure 11A:
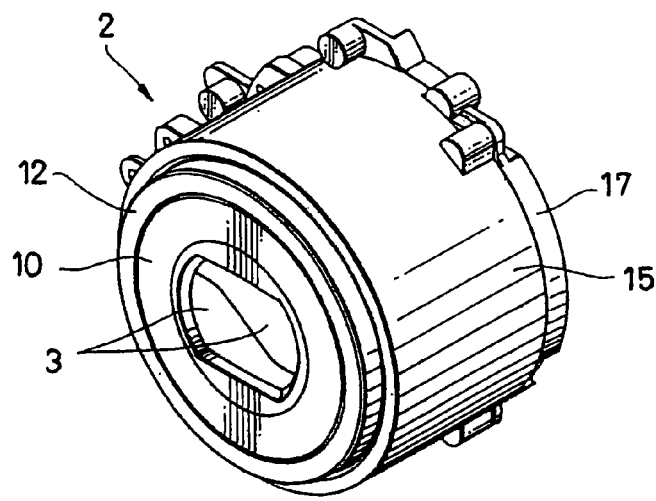
FIG. 11A is a perspective view showing an external appearance of a collapsible lens of an optical unit in the collapsed state.
Figure 11B:
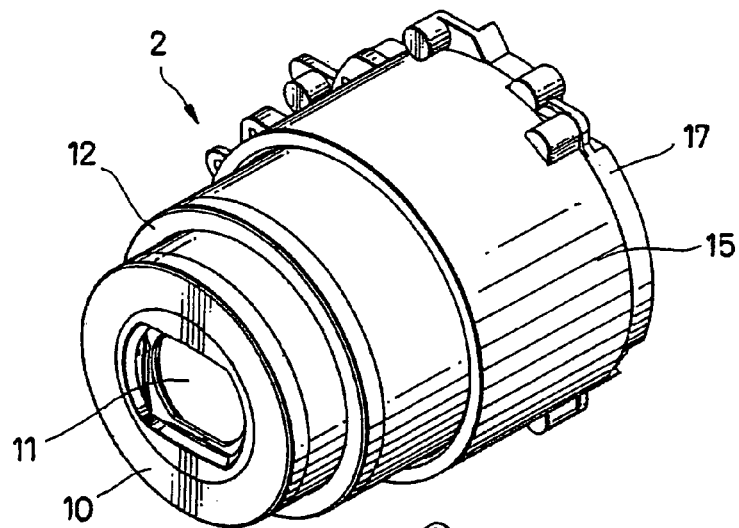
FIG. 11B is a perspective view showing an external appearance of the collapsible lens of the optical unit in the wide state.
Figure 11C:
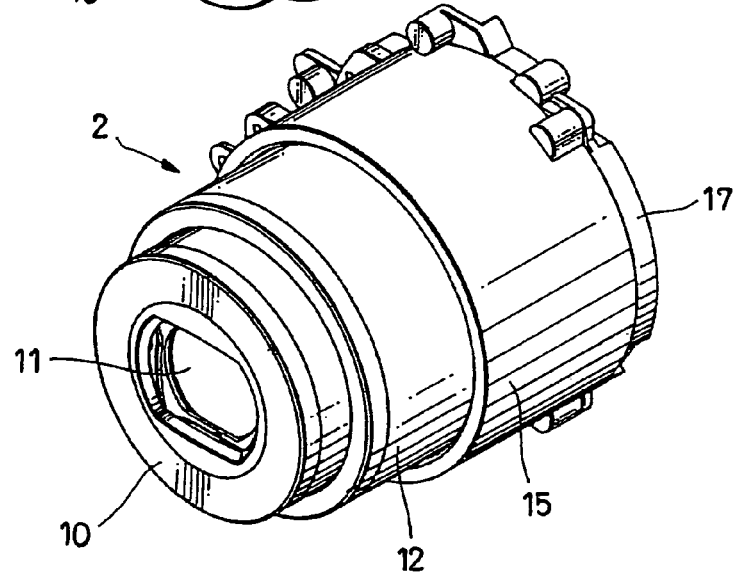
FIG. 11C is a perspective view showing an external appearance of the collapsible lens of the optical unit in the telephoto state.

FIGS. 5A, 5B and 5C are sectional views of a collapsible lens according to a second embodiment of the present application; FIG. 5A shows the retracted state, that is, a collapsed position of the lens when not used; FIG. 5B shows the wide angle position thereof; and FIG. 5C shows the telephoto position thereof. FIGS. 6A and 6B are sectional views for explaining the operation of taking in and out the infrared cutoff filter of a collapsible lens. FIG. 7 is a side view showing the second group lens frame and rear barrel. FIG. 8 is a perspective view similarly showing the second group lens frame and rear barrel.

In a collapsible lens 100, the same as described with reference to FIGS. 1A, 1B and 1C, the first group lens frame 10 holding a plurality of lenses 11 and the second group lens frame 13B holding a plurality of lenses 13a are driven by the cam ring 12 to rotate and move from the collapsed position in FIG. 5A to the wide position in FIG. 5B and from the wide position in FIG. 5B to the telephoto position in FIG. 5C for the zooming operation and the wide operation reverse thereto. Thus, the description of redundant parts will be omitted.

The collapsible lens 100 according to the second embodiment has a characteristic that a forcible escape mechanism 92 is provided to make the optical filter escape forcibly from a position on the optical axis to a position off the optical axis on an abnormal occasion when the escape mechanism 88 does not work. Then, the forcible escape mechanism 92 of the optical filter will be described below with reference to FIGS. 5A to 5C, FIGS. 6A and 6B, FIG. 7 as well as FIG. 8.

Note that, in FIGS. 5A to 5C, FIGS. 6A and 6B, FIG. 7 and FIG. 8, the same parts as described above referring to FIGS. 1A to 1C, FIG. 2, FIGS. 3A and 3B are denoted by the same signs.

The collapsible lens (image-pickup lens portion) 100 according to the second embodiment has approximately the same whole structure as the collapsible lens having "the night-shot function capable of photographing at night" described with reference to FIGS. 1A to 1C and so on, so that hereupon the whole structure is described schematically and the discriminative points will be described in detail.

In FIGS. 5A to 5C, a reference numeral 10 denotes the first group lens frame; a reference numeral 12 denotes the cam ring; a reference numeral 13B denotes the second group lens frame; a reference numeral 16 denotes the straight forward guide ring. A reference numeral 15 denotes the cam ring, which is integrally fixed to the front surface of the rear barrel 17B. The rear barrel 17B holds the optical low-pass filter 85 and the solid-state imaging device 24. In front of the optical low-pass filter 85, the infrared cutoff filter 91 as a specific example of the optical filter is arranged to be linearly movable between a position on the optical axis L and a position off the optical axis.

It is designed that the infrared cutoff filter automatically escapes to a predetermined position off the optical axis when retracted and collapsed by the escape mechanism 88 which makes the infrared cutoff filter 91 move inward and outward. In conjunction with this escape mechanism 88, the forcible escape mechanism 92 is provided. The forcible escape mechanism 92 is the mechanism which makes the infrared cutoff filter 91 move forcibly to the predetermined escape position, when the infrared cutoff filter 91 does not escape to the predetermined position due to malfunction of the escape mechanism 88 in collapsing operation.

In this embodiment, a projection 92 as a specific example of the forcible escape mechanism is provided in the second group lens frame 13B. As shown in FIGS. 7, 8 and other figures, the projection 92 provided in the second group lens frame 13B is shaped like a wedge made by tapering a plate member to the tip, where an inclined plane 92a is formed.

In the collapsing operation, the projection 92 depresses a pressure-receiving portion 79c of the fan-shaped gear 79 of the power transmission mechanism 83 to make the mechanism 83 operate such that the filter holder 82 will move in a direction away from the optical axis L. In other words, the forcible escape mechanism 92 in this embodiment is designed to make the escape mechanism 88 operate using a force of moving the second group lens frame 13B in the direction of optical axis as the power, and to make the infrared cutoff filter 91 escape forcibly off the optical axis L.

Next, the operation of this embodiment will be described. In the states where used as the optical lens from the collapsed state in FIG. 5A through the wide state in FIG. 5B to the telephoto state in FIG. 5C, by setting the infrared cutoff filter 91 on and off the optical axis L, the infrared-shot function is given to perform the infrared photography.

Specifically, by selecting from the state where the infrared cutoff filter 91 is set on the optical axis L as shown in FIG. 6A and the state where the infrared filter 91 is moved from a position on the optical axis L to a position off the optical axis L as shown in FIG. 6B (arrow mark H), the photographing at night can be performed by means of the above-described night-shot function and night-framing function.

In collapsing operation of the collapsible lens 100, as shown in FIG. 5A, power is given from the power source 76 to the filter holder 82 to make the infrared cutoff filter 91 escape in the direction intersecting the optical axis L through the filter holder 82. Subsequently, the third group lens frame 18B is retracted into the vacant space made after the infrared cutoff filter 91 has retracted in the direction intersecting the optical axis L (arrow mark I).

Accordingly, the third group lens frame 18B can be retracted in a deeper position than before to be in a thinner state. In addition, since the third group lens frame 18B is retracted to be thinner than before, the first group lens frame 10, the second group lens frame 13B, and the straight forward guide ring 16 can be retracted into the vacant space in a superimposed manner by moving along a predetermined curve (arrow marks A, B and C).

In this case, if the user applies an external force to the collapsible lens 100 forcibly by manual operation based on such causes that power supply suddenly stops and so on, for example, with a user turning off the power supply, or battery's being suddenly dead, or with a user opening the battery box, the collapsing operation will be performed forcibly; on such occasion, the forcible escape mechanism 92 will operate.

Figure 16:
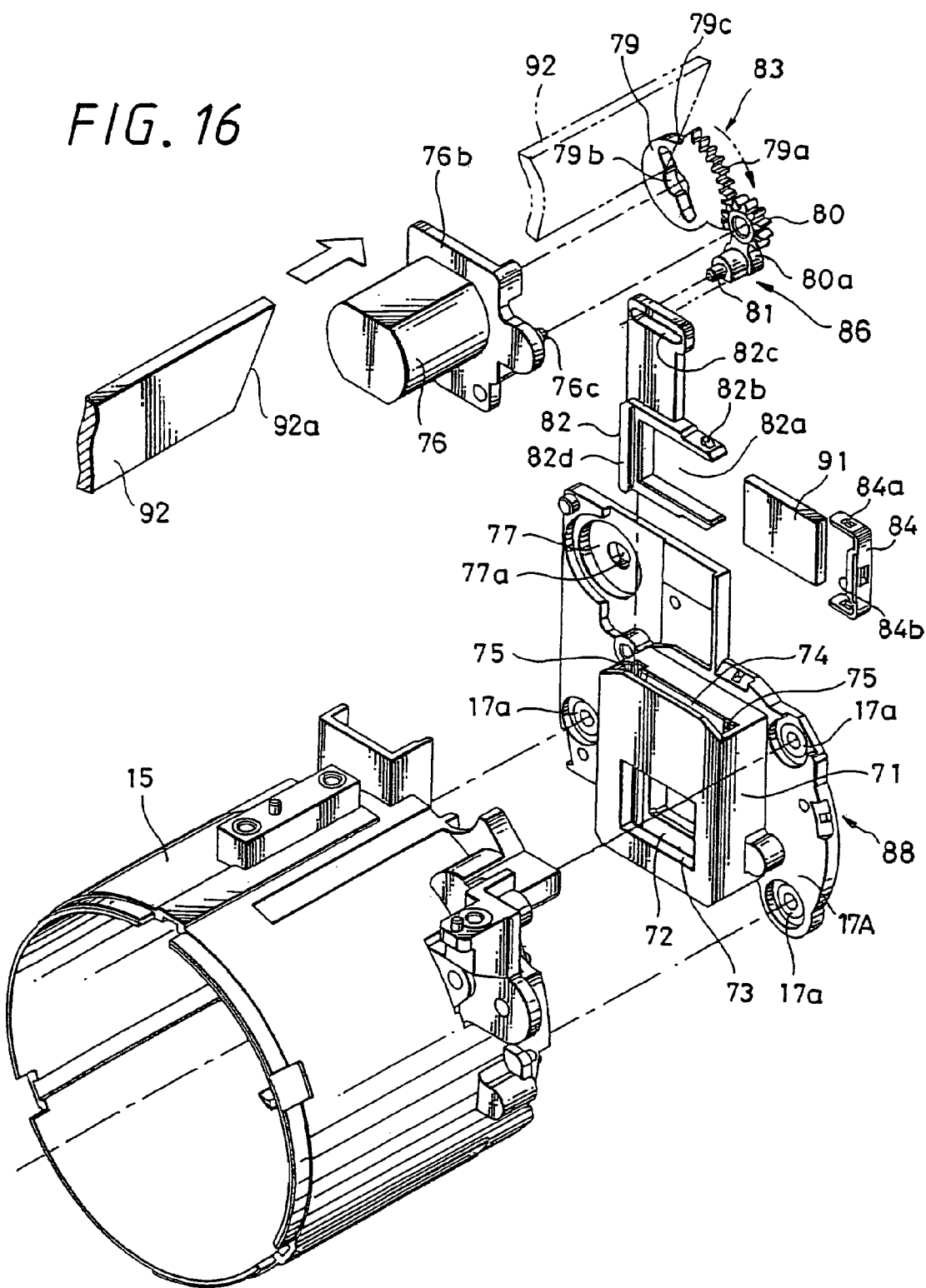
FIG. 16 is an exploded perspective view seen from the front side of the escape mechanism or the like of the infrared cutoff filter of the collapsible lens shown in FIG. 14 according to prior art having the night-shot function.
Figure 17:
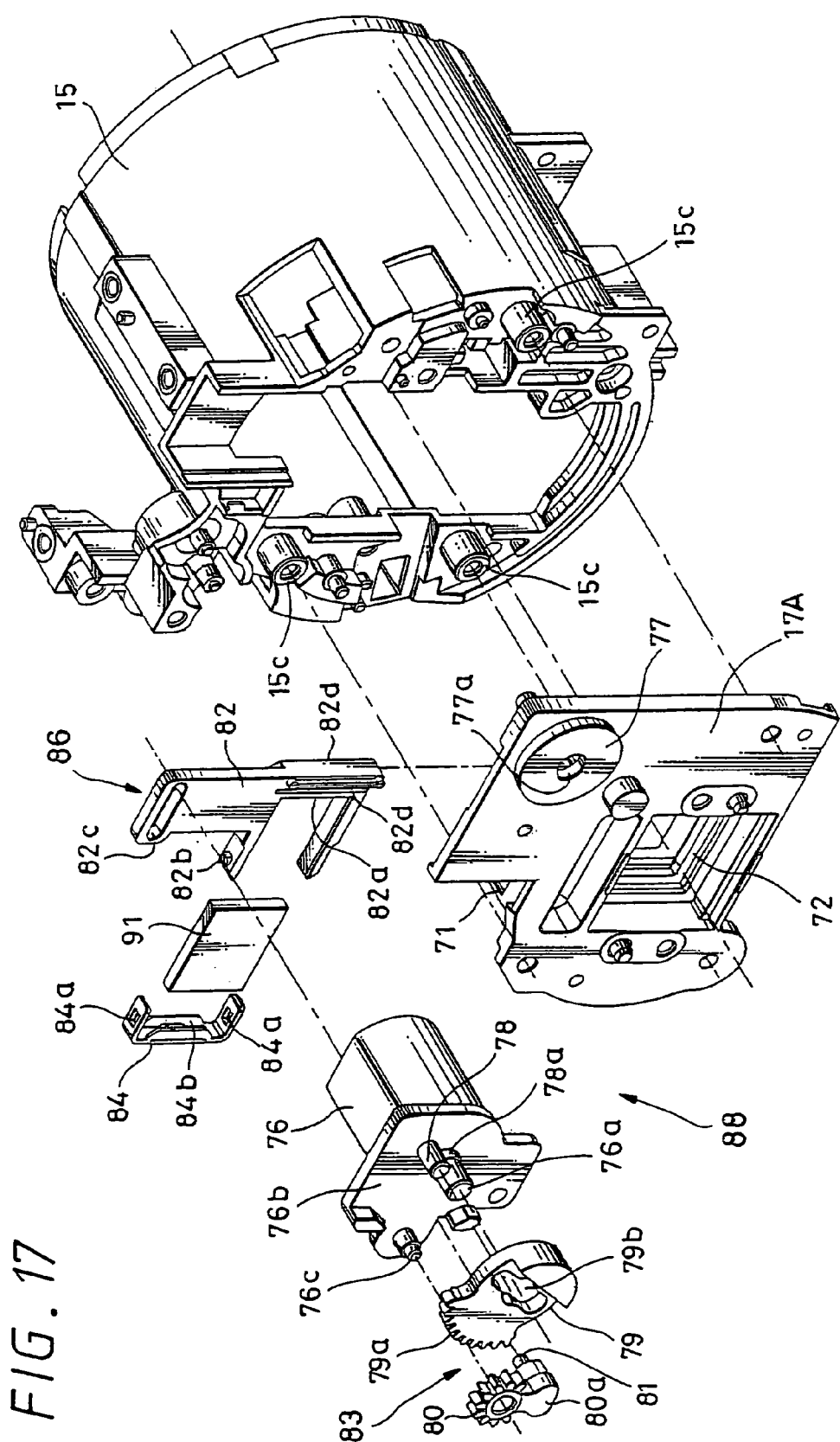
FIG. 17 is an exploded perspective view seen from the rear side of the escape mechanism or the like of the infrared cutoff filter of the collapsible lens shown in FIG. 14 according to prior art having the night-shot function.

Specifically, if the user attempts to collapse the collapsible lens 100 forcibly by manual operation, as shown in FIG. 16, the inclined plane 92a of the projection 92 abuts from above on the pressure-receiving portion 79c of the fan-shaped gear 79 of the power transmission mechanism 83 at the end of the collapsing operation. Hence, the inclined plane 92a depresses the fan-shaped gear 79 to turn clockwise as shown in FIG. 16. As a result, through the operation of the pinion gear 80 and drive pin 81, the filter holder 82 moves outward and the infrared cutoff filter 91 held by the filter holder 82 moves from a position on the optical axis L to a position off the optical axis L.

As described above, according to the collapsible lens 100 in this embodiment, even if the infrared cutoff filter 91 is left on the optical axis L when the collapsing operation is performed due to the user's forcible collapsing operation, the malfunction of the escape mechanism 88, and the like, the infrared cutoff filter 91 can be made to escape forcibly from the position on the optical axis L to a position off the optical axis L by the forcible escape mechanism 92. Therefore, the infrared cutoff filter 91, the filter holder 82 thereof, and the like can be prevented from contacting or interfering with other parts, and so the infrared cutoff filter 91, the filter holder 82, the power transmission mechanism 83 thereof, or the driving mechanism of the collapsible lens itself such as the cam ring 12 are prevented from being destroyed in structure, which enables the reliability to be improved.

The present invention is not limited to the embodiments described above and shown in the drawings, and various modifications can be practiced without departing from the spirit of the invention.

For example, although in the above embodiments the structure in which the infrared cutoff filter is made to escape in the direction intersecting the optical axis is employed, the direction is not necessarily intersecting the optical axis, where a structure in which the infrared cutoff filter can be set on and off the optical axis to function appropriately, for example, the infrared cutoff filter may be moved in a diagonal direction or can be moved along an arc by turning operation around an axis, so that there is no limitation in the direction that the infrared cutoff filter is taken in and out. In addition, the mechanism for taking the infrared cutoff filter in and out is also not limited to the above-described embodiments.

Moreover, while, in the above embodiments, the rail-like guide portion 75 for making the infrared cutoff filter movable in the direction intersecting the optical axis is provided in the rear barrel, drive and guide means of the infrared cutoff filter may be formed of other members (flap type, turn type or the like, for example,) or may be provided in the barrier drive mechanism and the like.

Furthermore, the structure of lenses of the collapsible lens as well as a drive system of the collapsible lens is also not limited to the above-described embodiments. Moreover, with respect to the driving source, not only a stepping motor but also an ultrasonic motor, a conventional DC motor or the like can be employed. In addition, the gear unit is not always necessary and, for example, a direct drive using an ultrasonic motor, a linear motor and so on may be employed.

Also, a collapsing structure of the collapsible lens is not limited to the cam mechanism with the cam groove and cam pin, and only a mechanism retracting the optical lens system to be thin is needed; hence, various mechanisms such as a ball thread type, a rack-pinion type, a linear motor type can also be adopted. Further, the optical filter made to escape by the escape mechanism 88 and the forcible escape mechanism 92 is not limited to the above-described infrared cutoff filter and, for example, an optical low-pass filter, a liquid crystal device, an EC device and other elements like the optical filter can be applied thereto.

The invention claimed is:

1. An optical unit of a collapsible type including
   a fixed barrel,
   at least one lens barrel movable along a direction of the optical axis with respect to said fixed barrel, and
   a lens and an optical filter provided between said fixed barrel and said lens barrel, comprising:
   an escape mechanism for making said optical filter move in a direction intersecting an optical axis to escape off the optical axis, when said lens barrel is collapsed, wherein said lens is retractable in a resultant position on the optical axis after said optical filter is moved.

2. An optical unit according to claim 1, wherein
   said escape mechanism comprises a casing that is provided in said fixed barrel and that holds said optical filter movably, and a move mechanism for making said optical filter move between said position on the optical axis and a position off the optical axis.

3. An optical unit according to claim 2, wherein
   said move mechanism comprises a filter holder to hold said optical filter, a power source generating power to move said filter holder within said casing, and a power transmission mechanism to transmit power from said power source to said filter holder to be linearly moved.

4. An optical unit according to claim 1, wherein said optical filter is an infrared cutoff filter and/or a low-pass filter.

5. An optical unit of a collapsible type including
   a fixed barrel,
   at least one lens barrel movable along a direction of the optical axis with respect to said fixed barrel, and
   a lens and an optical filter provided between said fixed barrel and said lens barrel, comprising:
   an escape mechanism for making said optical filter move in a direction intersecting an optical axis to escape off the optical axis, when said lens barrel is collapsed, and
   a forcible escape mechanism for making said optical filter escape off the optical axis forcibly, when said escape mechanism cannot make the optical filter escape off the optical axis.

6. An optical unit according to claim 5, wherein
   said forcible escape mechanism comprises a projection provided in said lens barrel on the side of said optical filter, and a pressure-receiving portion provided in a member on the side of said optical filter and depressed by said projection abutting thereon, which makes the optical filter move from a position on the optical axis to a position off the optical axis.

7. An optical unit according to claim 5, wherein
   said forcible escape mechanism has a projection in said lens barrel on the side of said optical filter and actuates said escape mechanism by said projection to make said optical filter escape off the optical axis forcibly.

8. An optical unit according to claim 5, wherein
   said escape mechanism comprises a casing that is provided in said fixed barrel and that holds said optical filter movably, and a move mechanism for making the optical filter move between said position on the optical axis and a position off the optical axis.

9. An optical unit according to claim 8, wherein
   said move mechanism comprises a filter holder for holding said optical filter, a power source generating power to move said filter holder within said casing, and a power transmission mechanism to transmit the power from said power source to said filter holder to be linearly moved.

10. An optical unit according to claim 5, wherein said optical filter is an infrared cutoff filter and/or a low-pass filter.

11. An image-pickup apparatus comprising an optical unit which includes
    a fixed barrel,
    at least one lens barrel movable along the optical axis with respect to said fixed barrel,
    a lens and an optical filter provided between said fixed barrel and said lens barrel, and
    an escape mechanism for making said optical filter move in a direction intersecting an optical axis to escape off the optical axis, when said lens barrel is collapsed, wherein
    said lens can be retracted in a resultant position on the optical axis after said optical filter is moved.

12. An image-pickup apparatus comprising a collapsible optical unit which includes
    a fixed barrel,
    at least one lens barrel movable along a direction of the optical axis with respect to said fixed barrel,
    a lens and an optical filter provided between said fixed barrel and said lens barrel,
    an escape mechanism for making said optical filter move in a direction intersecting an optical axis to escape off the optical axis, when said lens barrel is collapsed, and
    a forcible escape mechanism for making said optical filter escape from a position on the optical axis forcibly, when said escape mechanism cannot make said optical filter escape from the position on the optical axis.

* * * * *